United States Patent
Poss et al.

(10) Patent No.: US 12,190,924 B1
(45) Date of Patent: Jan. 7, 2025

(54) LASER MODE HOP COMPENSATION USING MULTI-SECTOR FEEDBACK IN HEAT ASSISTED MAGNETIC RECORDING

(71) Applicant: Western Digital Technologies, Inc., San Jose, CA (US)

(72) Inventors: Joey M. Poss, San Jose, CA (US); Bernhard E. Knigge, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/412,710

(22) Filed: Jan. 15, 2024

(51) Int. Cl.
- G11B 5/54 (2006.01)
- G11B 5/596 (2006.01)
- G11B 5/60 (2006.01)
- G11B 7/1263 (2012.01)
- G11B 5/00 (2006.01)

(52) U.S. Cl.
CPC .......... G11B 7/1263 (2013.01); G11B 5/6029 (2013.01); G11B 5/607 (2013.01); G11B 2005/0021 (2013.01)

(58) Field of Classification Search
CPC ... G11B 5/596; G11B 2005/0021; G11B 5/48; G11B 5/56; G11B 33/144; G11B 5/09; G11B 5/455; G11B 5/012; G11B 5/54; G11B 20/12; G11B 5/59688; G11B 5/6088
USPC .......................................................... 360/75
See application file for complete search history.

(56) References Cited

U.S. PATENT DOCUMENTS

| | | | |
|---|---|---|---|
| 9,311,943 B2 * | 4/2016 | Canchi | G11B 5/6088 |
| 9,595,288 B1 | 3/2017 | Chu et al. | |
| 9,916,851 B1 | 3/2018 | Seigler et al. | |
| 10,720,177 B1 | 7/2020 | Ng et al. | |
| 10,902,876 B2 | 1/2021 | Tatah et al. | |
| 10,997,997 B1 | 5/2021 | Xiong | |
| 2016/0087401 A1 | 3/2016 | Wessel et al. | |

OTHER PUBLICATIONS

Sakoguchi et al., Mode hopping impact on NFT protrusion measurement in HAMR, IEEE Transactions on Magnetics, Jul. 10, 2023, p. 2.

* cited by examiner

*Primary Examiner* — Nabil Z Hindi
(74) *Attorney, Agent, or Firm* — Neugeboren O'Dowd PC

(57) ABSTRACT

Various illustrative aspects are directed to a data storage device comprising a disk, a read/write head configured to read data from and write data to the disk, a laser diode (LD) coupled to a nearfield transducer configured to heat an area of the disk near the read/write head, a first resistive temperature detector (RTD), a second RTD, and one or more processing devices configured to: apply a laser bias to the LD during a write operation; obtain a plurality of differential signal measurements, based at least in part on a plurality of measurements from each of the first and second RTDs; and adjust the laser bias applied to the LD, based at least in part on comparing the plurality of differential signal measurements to a target value for the differential signal.

25 Claims, 16 Drawing Sheets

LASER MODE HOP COMPENSATION USING MULTI-SECTOR FEEDBACK IN HEAT ASSISTED MAGNETIC RECORDING

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1A is a conceptual diagram of a prior art disk format 2 comprising a number of radially-spaced, concentric servo tracks 4 defined by servo wedges $6_0$-$6_N$ recorded around the circumference of each servo track. A plurality of concentric data tracks are defined relative to servo tracks 4, wherein the data tracks may have the same or a different radial density (e.g., tracks per inch (TPI)) than servo tracks 6. Each servo wedge $6_i$ comprises a preamble 8 for storing a periodic pattern, which allows proper gain adjustment and timing synchronization of the read signal, and a synchronization mark 10 (sync mark 10) for storing a special pattern used to symbol synchronize to a servo data field 12. Servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head positioning information is processed to position a head over a target data track during a seek operation, and servo bursts 14 provide fine head position information used for centerline tracking while accessing a data track during write/read operations. A position error signal (PES) is generated by reading servo bursts 14, wherein the PES represents a measured position of the head relative to a centerline of a target servo track. A servo controller processes the PES to generate a control signal applied to one or more actuators to actuate the head radially over the disk in a direction that reduces the PES.

The description provided in this background section should not be assumed to be prior art merely because it is mentioned in or associated with this section. The background section may include information that describes one or more aspects of the subject technology.

SUMMARY

The following summary relates to one or more aspects and/or embodiments disclosed herein. It should not be considered an extensive overview relating to all contemplated aspects and/or embodiments, nor should it be regarded to identify key or critical elements relating to all contemplated aspects and/or embodiments or to delineate the scope associated with any particular aspect and/or embodiment. Accordingly, the following summary has the sole purpose of presenting certain concepts relating to one or more aspects and/or embodiments relating to the mechanisms disclosed herein in a simplified form to precede the detailed description presented below.

Some disk drives employ heat-assisted magnetic recording (HAMR) by using a laser diode to briefly reduce the coercivity of the disk's magnetic material, which allows for denser data writing. In some cases, however, laser diodes (LDs) in HAMR drives are susceptible to temperature-induced mode hopping, for instance, during the start of a write operation, seeking between tracks, servo sector or servo wedge crossings, etc. For example, during HAMR write, the temperature of an LD may increase (e.g., by 10-20 degrees C.), and several mode hop critical temperatures may be crossed during this temperature transient. In some circumstances, one or more mode hop events may be triggered during this transient phase, which may adversely impact write performance. In some instances, mode hop events during a HAMR write operation may result in recording non-uniformities, which degrades HAMR recording performance.

Thus, HAMR drives face the issue of "mode hopping," where temperature changes in the LD cause it to switch between different lasing modes, leading to variations in output power and wavelength. This can cause inconsistent heating applied to the media, compromise the reliability of data recording, and reduce heating effectiveness if the new wavelength mismatches the HAMR head's settled wavelength after switching to write mode. Hence, effective temperature management of the laser diode is crucial for reliable HAMR data writing operation.

In some instances, chances for hard errors may increase due to mode hop event(s) and/or changes in laser diode temperature, for instance, if the laser output is not optimized for multiple sectors of the disk drive. In some circumstances, disturbances in track width (e.g., magnetic write width (MWW), which may be measured as a percentage of the track pitch) may be caused due to changes in the near-field transducer (NFT) temperature sensor, also referred to as NTS. In some cases, the mode hop events may be of a significantly shorter duration (e.g., <50 ns) than the time constant (e.g., 1 μs) of the NTS element, which can inhibit fast detection and/or recovery from such mode hop events. To alleviate such issues, aspects of the present disclosure are directed to performing feedback on a sector-by-sector basis. This can help in one or more of adjusting the laser write bias, compensating for fly-height changes, and/or adjusting the laser starting point (i.e., the point or time at which the laser starts lasing to write data to the disk).

In some aspects of the disclosure, a differential signal (also referred to as differential NTS or DNTS) can be sampled or monitored during operation of the disk drive. Additionally, the DNTS feedback can be used to adjust one or more parameters of the laser, including at least the laser bias. In some cases, additional operating parameters (e.g., thermal fly-height control or TFC, a target value for the DNTS) of the HAMR drive can also be adjusted to further optimize operation of the disk drive, described in further detail below.

In some aspects, the techniques described herein relate to a data storage device including: a disk; a read/write head configured to read data from and write data to the disk; a laser diode coupled to a nearfield transducer configured to heat an area of the disk near the read/write head; a first resistive temperature detector (RTD); a second RTD; and one or more processing devices configured to: apply a laser bias to the laser diode during a write operation; obtain a plurality of differential signal measurements, based at least in part on a plurality of measurements from each of the first RTD and the second RTD; and adjust the laser bias applied to the laser diode, based at least in part on comparing the plurality of differential signal measurements to a target value for the differential signal.

In some aspects, the techniques described herein relate to a method of operating a data storage device, including: applying a laser bias to a laser diode of the data storage device during a write operation, wherein the data storage device comprises a disk, a read/write head configured to read data from and write data to the disk; the laser diode coupled to a nearfield transducer configured to heat an area of the disk near the read/write head, a first resistive temperature detector (RTD), and a second RTD; obtaining a plurality of differential signal measurements, based at least in part on a plurality of measurements from each of the first RTD and the second RTD; and adjusting the laser bias applied to the laser diode, based at least in part on comparing the plurality of differential signal measurements to a target value for the differential signal.

In some aspects, the techniques described herein relate to one or more processing devices, including: means for applying, during a write operation, a laser bias to a laser diode of a data storage device, wherein the data storage device includes: a disk, a read/write head configured to read data from and write data to the disk, the laser diode coupled to a nearfield transducer configured to heat an area of the disk near the read/write head, a first resistive temperature detector (RTD), and a second RTD; means for obtaining a plurality of differential signal measurements, based at least in part on obtaining the plurality of measurements from each of the first RTD and the second RTD; means for determining a target value for a differential signal, wherein the differential signal is associated with the first RTD and the second RTD; and means for adjusting the laser bias applied to the laser diode, based at least in part on comparing the plurality of differential signal measurements to the target value for the differential signal; and one or more of a plurality of sensitivity adjustments, comprising (1) a differential signal measurement to thermal fly height control (TFC) sensitivity and (2) a thermal fly height control (TFC) to laser bias correction sensitivity.

In some aspects, the techniques described herein relate to a data storage device including: a disk; a read/write head configured to read data from and write data to the disk; a laser diode configured to heat an area of the disk near the read/write head; a first resistive temperature detector (RTD); a second RTD; and one or more processing devices configured to: apply a laser bias to the laser diode during a write operation; obtain a plurality of measurements from the first RTD; obtain a plurality of measurements from the second RTD; obtain a plurality of differential signal measurements, based at least in part on the plurality of measurements from each of the first RTD and the second RTD; determine a target value for a differential signal, wherein the differential signal is associated with the first RTD and the second RTD; and adjust the laser bias applied to the laser diode, based at least in part on comparing the plurality of differential signal measurements to the target value for the differential signal.

In some aspects, the techniques described herein relate to a data storage device, wherein the first RTD includes a nearfield transducer temperature sensor (NTS), and wherein the second RTD includes an embedded contact sensor (ECS).

In some aspects, the techniques described herein relate to a data storage device, wherein obtaining the plurality of differential signal measurements includes: obtaining a plurality of NTS measurements from the NTS for a plurality of sectors or sector IDs (SIDs); obtaining a plurality of ECS measurements from the ECS for the plurality of sectors or SIDs; subtracting a respective ECS measurement from a respective NTS measurement to obtain at least one differential signal measurement for each of the plurality of sectors or sector IDs; wherein each of the plurality of differential signal measurements includes a DNTS measurement, and wherein the target value for the differential signal includes a DNTS target value.

In some aspects, the techniques described herein relate to a data storage device, wherein the one or more processing devices are further configured to: compute an average of at least two of the plurality of DNTS measurements, wherein each of the at least two DNTS measurements correspond to different sectors or SIDs; and wherein comparing the plurality of differential signal measurements to the target value for the differential signal includes: determining a DNTS error, based at least in part on comparing the average of the at least two DNTS measurements to the DNTS target value.

In some aspects, the techniques described herein relate to a data storage device, wherein the one or more processing devices are further configured to: determine a first sensitivity, wherein the first sensitivity comprises a differential signal measurement of the plurality of differential signal measurements (DNTS) to laser bias sensitivity; and wherein adjusting the laser bias applied to the laser diode further includes: determining a laser bias correction, wherein the laser bias correction is based on the first sensitivity and a DNTS error, wherein the DNTS error is based on comparing an average of at least two DNTS measurements to a DNTS target value; and adding the laser bias correction to the laser bias.

In some aspects, the techniques described herein relate to a data storage device, wherein the one or more processing devices are further configured to: determine a first sensitivity, wherein the first sensitivity includes a DNTS to laser bias sensitivity; and wherein adjusting the laser bias applied to the laser diode further includes: determining a laser bias correction, wherein the laser bias correction is based on the DNTS error and the first sensitivity; and adding the laser bias correction to the laser bias.

In some aspects, the techniques described herein relate to a data storage device, wherein the DNTS target value is specific to the read/write head and is based at least in part on one or more of a write current, a laser current, a temperature, and fly-height control information for the read/write head.

In some aspects, the techniques described herein relate to a data storage device, wherein the one or more processing devices are further configured to: determine a second sensitivity, wherein the second sensitivity includes a DNTS to thermal fly height control (TFC) sensitivity; and determine a third sensitivity, wherein the third sensitivity includes a TFC to laser bias correction sensitivity.

In some aspects, the techniques described herein relate to a data storage device, wherein the one or more processing devices are further configured to: determine a TFC value for controlling a fly-height of the read/write head, wherein the TFC value is based at least in part on the DNTS target value; and wherein the second sensitivity and the third sensitivity are determined via TFC dithering.

In some aspects, the techniques described herein relate to a data storage device, wherein the one or more processing devices are further configured to: monitor a change in the fly-height of the read/write head; determine a TFC correction to compensate for the change in the fly-height of the read/write head, wherein the TFC correction is based at least in part on one or more of the laser bias correction, the second sensitivity, and the third sensitivity; and adjust the TFC value, based at least in part on determining the TFC correction.

In some aspects, the techniques described herein relate to a data storage device, wherein the one or more processing devices are further configured to: adjust the DNTS target value, based at least in part on the TFC correction and at least one of the second sensitivity and the third sensitivity; and wherein adjusting the laser bias is further based at least in part on adjusting the DNTS target value.

In some aspects, the techniques described herein relate to a data storage device, wherein the one or more processing devices are further configured to: measure a laser diode voltage ($V_{LD}$) at a pre-write time or prior to the write operation; and wherein adjusting the DNTS target value is further based on one or more of a temperature change profile for the laser diode and the $V_{LD}$.

In some aspects, the techniques described herein relate to a data storage device, wherein the one or more processing devices are further configured to: adjust the TFC value to compensate for a change in fly-height of the read/write head, wherein adjusting the TFC value is based at least in part on one or more of the DNTS target value, the DNTS error, a laser bias correction, the first sensitivity, the second sensitivity, the third sensitivity, a TFC correction, and an adjusted DNTS target value.

In some aspects, the techniques described herein relate to a data storage device, wherein adjusting the laser bias applied to the laser diode is further based at least in part on adjusting the TFC value and adjusting the DNTS target value.

In some aspects, the techniques described herein relate to a method of operating a data storage device, including: applying a laser bias to a laser diode of the data storage device during a write operation, wherein the data storage device includes: a disk, a read/write head configured to read data from and write data to the disk, a first resistive temperature detector (RTD), and a second RTD; obtaining a plurality of measurements from the first RTD; obtaining a plurality of measurements from the second RTD; obtaining a plurality of differential signal measurements, based at least in part on the plurality of measurements from each of the first RTD and the second RTD; determining a target value for a differential signal, wherein the differential signal is associated with the first RTD and the second RTD; and adjusting the laser bias applied to the laser diode, based at least in part on comparing the plurality of differential signal measurements to the target value for the differential signal.

In some aspects, the techniques described herein relate to a method, wherein the first RTD includes a nearfield transducer temperature sensor (NTS), and wherein the second RTD includes an embedded contact sensor (ECS), and wherein obtaining the plurality of differential signal measurements includes: obtaining a plurality of NTS measurements from the NTS for a plurality of sector IDs (SIDs); obtaining a plurality of ECS measurements from the ECS for the plurality of SIDs; and subtracting a respective ECS measurement from a respective NTS measurement to obtain at least one differential signal measurement for each of the plurality of sector IDs; and wherein each of the plurality of differential signal measurements includes a DNTS measurement, and wherein the target value for the differential signal includes a DNTS target value.

In some aspects, the techniques described herein relate to a method, further including: computing an average of at least two of the plurality of DNTS measurements, wherein each of the at least two DNTS measurements correspond to different SIDs; and wherein comparing the plurality of differential signal measurements to the target value for the differential signal includes: determining a DNTS error, based at least in part on comparing the average of the at least two DNTS measurements to the DNTS target value.

In some aspects, the techniques described herein relate to a method, further including determining a first sensitivity, wherein the first sensitivity includes a DNTS to laser bias sensitivity; and wherein adjusting the laser bias applied to the laser diode further includes: determining a laser bias correction, wherein the laser bias correction is based on the DNTS error and the first sensitivity; and adding the laser bias correction to the laser bias.

In some aspects, the techniques described herein relate to a method, further including: determining a second sensitivity, wherein the second sensitivity includes a DNTS to thermal fly height control (TFC) sensitivity; determining a third sensitivity, wherein the third sensitivity includes a TFC to laser bias correction sensitivity; and determining a TFC value for controlling a fly-height of the read/write head, wherein the TFC value is based at least in part on the DNTS target value; and wherein the second sensitivity and the third sensitivity are determined via TFC dithering.

In some aspects, the techniques described herein relate to a method, further including: measuring a laser diode voltage ($V_{LD}$) at a pre-write time or prior to the write operation; monitoring a change in the fly-height of the read/write head; determining a TFC correction to compensate for the change in the fly-height of the read/write head, wherein the TFC correction is based at least in part on one or more of the laser bias correction, the second sensitivity, and the third sensitivity; adjusting the TFC value, based at least in part on the TFC correction; and adjusting the DNTS target value based on one or more of the TFC correction, a temperature change profile for the laser diode, and $V_{LD}$.

In some aspects, the techniques described herein relate to a method, further including adjusting the TFC value to compensate for a change in fly-height of the read/write head, wherein adjusting the TFC value is based at least in part on one or more of the DNTS target value, the DNTS error, the laser bias correction, the first sensitivity, the second sensitivity, the third sensitivity, a TFC correction, and an adjusted DNTS target value.

In some aspects, the techniques described herein relate to one or more processing devices, including: means for applying, during a write operation, a laser bias to a laser diode of a data storage device, wherein the data storage device includes: a disk, a read/write head configured to read data from and write data to the disk, a first resistive temperature detector (RTD), and a second RTD; means for obtaining a plurality of measurements from the first RTD; means for obtaining a plurality of measurements from the second RTD; means for obtaining a plurality of differential signal measurements, based at least in part on obtaining the plurality of measurements from each of the first RTD and the second RTD; means for determining a target value for a differential signal, wherein the differential signal is associated with the first RTD and the second RTD; and means for adjusting the laser bias applied to the laser diode, based at least in part on comparing the plurality of differential signal measurements to the target value for the differential signal.

Various further aspects are depicted in the accompanying figures and described below and will be further apparent based thereon.

BRIEF DESCRIPTION OF THE DRAWINGS

Various features and advantages of the technology of this disclosure will be apparent from the following description of particular examples of those technologies, and as illustrated in the accompanying drawings. The drawings are not necessarily to scale; emphasis instead is placed on illustrating the principles of the technological concepts. In the drawings, like reference characters may refer to the same parts throughout different views. The drawings depict only illustrative examples of this disclosure and are not limiting in scope.

DETAILED DESCRIPTION

Figure 1A:
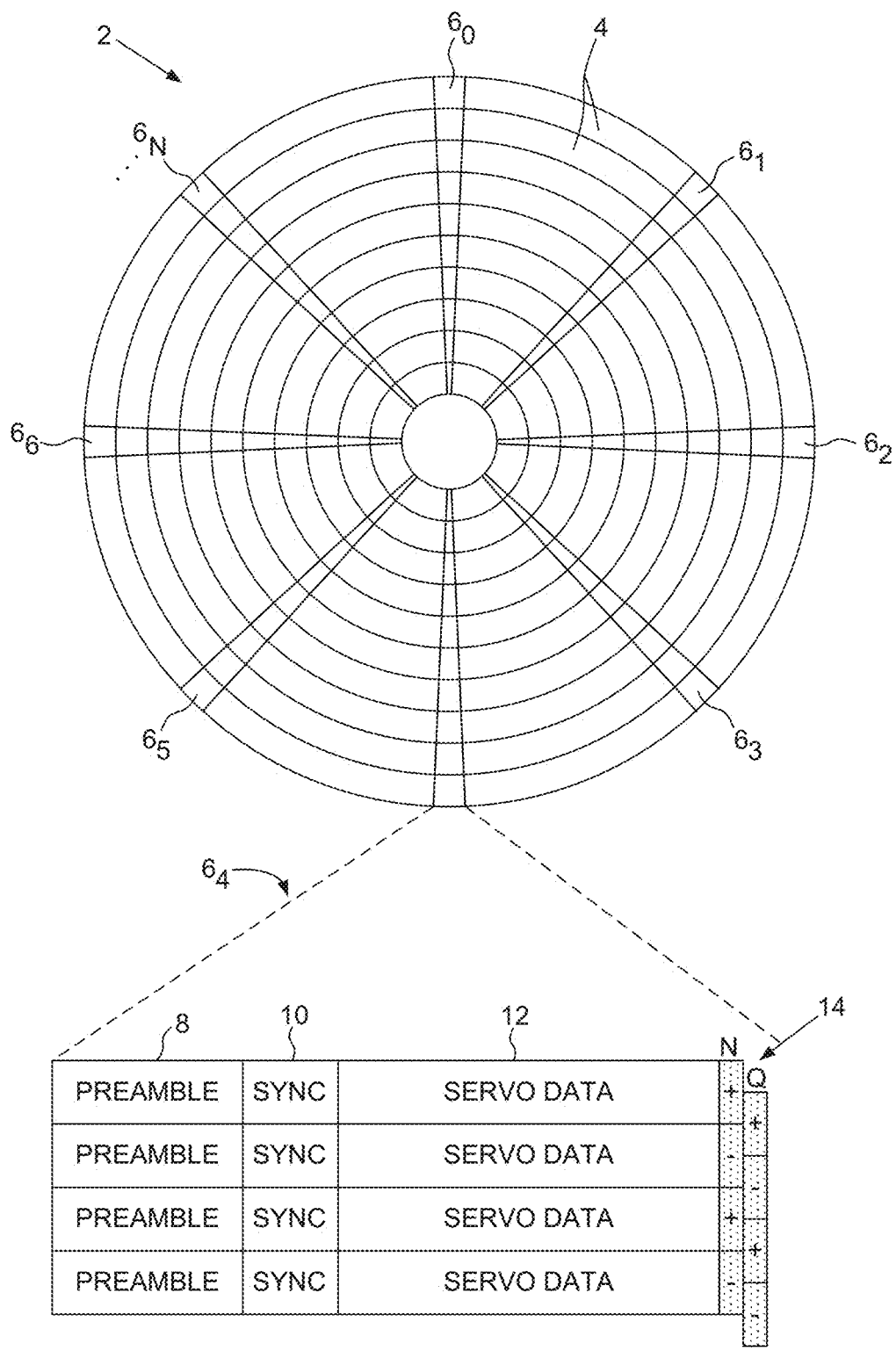
FIG. 1A is a conceptual diagram of a disk format comprising a number of radially-spaced, concentric servo tracks defined by servo wedges recorded around the circumference of each servo track, according to various aspects of this disclosure.

The word "exemplary" is used herein to mean "serving as an example, instance, or illustration." Any embodiment described herein as "exemplary" should not be construed as preferred or advantageous over other embodiments.

The embodiments described below are not intended to limit this disclosure to the precise form disclosed, nor are they intended to be exhaustive. Rather, they are presented to provide a description so that others skilled in the art may utilize their teachings. Technology continues to develop, and elements of the described and disclosed embodiments may be replaced by improved and enhanced items. However, the teachings of this disclosure inherently disclose elements used in embodiments incorporating technology available at the time of this disclosure.

The demand for data storage continues to increase rapidly, driving the need for hard drives that can store more data in the same physical space. However, traditional magnetic recording techniques face a physical limit known as the superparamagnetic limit. This is the point at which magnetic bits become so small that thermal fluctuations can cause them to spontaneously change state, leading to data loss. Heat-assisted magnetic recording (HAMR) is a technology developed to address this issue. HAMR overcomes the superparamagnetic limit by using heat to temporarily reduce the coercivity (resistance to changes in magnetization) of the magnetic material on the disk. This is achieved by using a laser diode (LD) to heat a small area of the disk, enabling data to be written at a higher density to that area. As the heated area cools, its coercivity returns to its original high level, effectively "locking" the data into place. HAMR allows for much higher data densities than traditional magnetic recording techniques, as it allows data bits to be written much more closely together without the risk of thermal instability.

In HAMR, a phenomenon known as "mode hopping" occurs when the LD used for heating the magnetic material switches, or "hops," between different lasing modes. Each mode corresponds to a different pattern of standing waves within the laser diode's cavity, which in turn corresponds to a specific wavelength of emitted light. Mode hopping in HAMR can be induced by temperature variations in the LD (or LD cavity within which the LD is positioned). As the LD operates, it naturally generates heat. Some non-limiting examples of factors that can affect LD temperature include power input, operation duty cycle, ambient temperature, and heat dissipation mechanisms. As the temperature of the LD changes, it can also impact the refractive index and/or physical dimensions of the LD cavity, potentially shifting the wavelength or frequency of the light emitted by the LD. In some instances, this shift may cause the laser to switch from one mode to another, herein referred to as "mode hopping".

In some circumstances, a laser encounters "mode hops" when the temperature transient changes. For instance, a laser may suddenly switch from operating in one resonator mode (e.g., producing energy with a first wavelength) to another mode (e.g., producing energy with a second, different wavelength) when the temperature transient equals a mode hop critical temperature. The laser then operates in the new resonator mode (e.g., producing energy with the second wavelength) for a range of temperature transients before switching to a different resonator mode (e.g., producing energy with a third wavelength). In some cases, the mode-hop effects induced in a laser can adversely affect the laser's ability to deliver optical power to the disk media in a consistent/effective manner. Furthermore, as noted above, the mode-hop effects are temperature dependent. In some circumstances, the optical power delivered to the disk media may depend on the reflection and/or absorption occurring in the LD and/or the near-field transducer (NFT). Thus, in some regards, the optical power spectrum of the LD is temperature dependent. Additionally, the frequency response of an optical transmission system may depend on the absorption, reflections, and/or physical length (e.g., length of LD cavity and/or waveguide). The combination of the optical power spectrum's temperature dependence and resonances in the optical transmission system may lead to fluctuations in the optical power delivered to the disk media, which can adversely impact HAMR recording performance.

Mode hopping can have several negative consequences in the context of HAMR. Mode hopping can cause sudden changes in the laser's output power and frequency, leading to variations in the heating of the magnetic material. This can result in inconsistent performance and potentially affect the reliability of the data recording process. Moreover, the optical components in the HAMR head may be optimized for a specific wavelength. If mode hopping causes the laser to emit light at a different wavelength, this could reduce the effectiveness of the heating process. Effective temperature management of the LD is critical to mitigate mode hopping and to maintain reliable operation of the HAMR system.

In some instances, chances for hard errors may increase due to mode hop event(s) and/or changes in laser diode temperature, for instance, if the laser output is not optimized for multiple sectors or sector IDs of the disk drive. In some circumstances, disturbances in track width (e.g., magnetic write width (MWW), which may be measured as a percentage of the track pitch) may be caused due to changes in the near-field transducer (NFT) temperature sensor, also referred to as NTS. In some cases, the mode hop events may be of a significantly shorter duration (e.g., <50 ns) than the time constant (e.g., 1 ps) of the NTS element, which can inhibit fast detection and/or recovery from such mode hop events. To alleviate against such issues, aspects of the present disclosure are directed to performing feedback on a sector by sector basis. This can help in one or more of adjusting the laser write bias, compensating for fly-height changes, and/or adjusting the laser starting point (i.e., the point or time at which the laser starts lasing to write data to the disk).

In some aspects of the disclosure, a differential signal (also referred to as differential NTS or DNTS) can be sampled or monitored during operation of the disk drive. Additionally, the DNTS feedback can be used to adjust one or more operating parameters of the laser, including at least the laser bias. In some cases, additional operating parameters (e.g., thermal fly-height control or TFC, a target value for the DNTS) of the HAMR drive can also be adjusted to further optimize operation of the disk drive, described in further detail below.

Figure 1B:
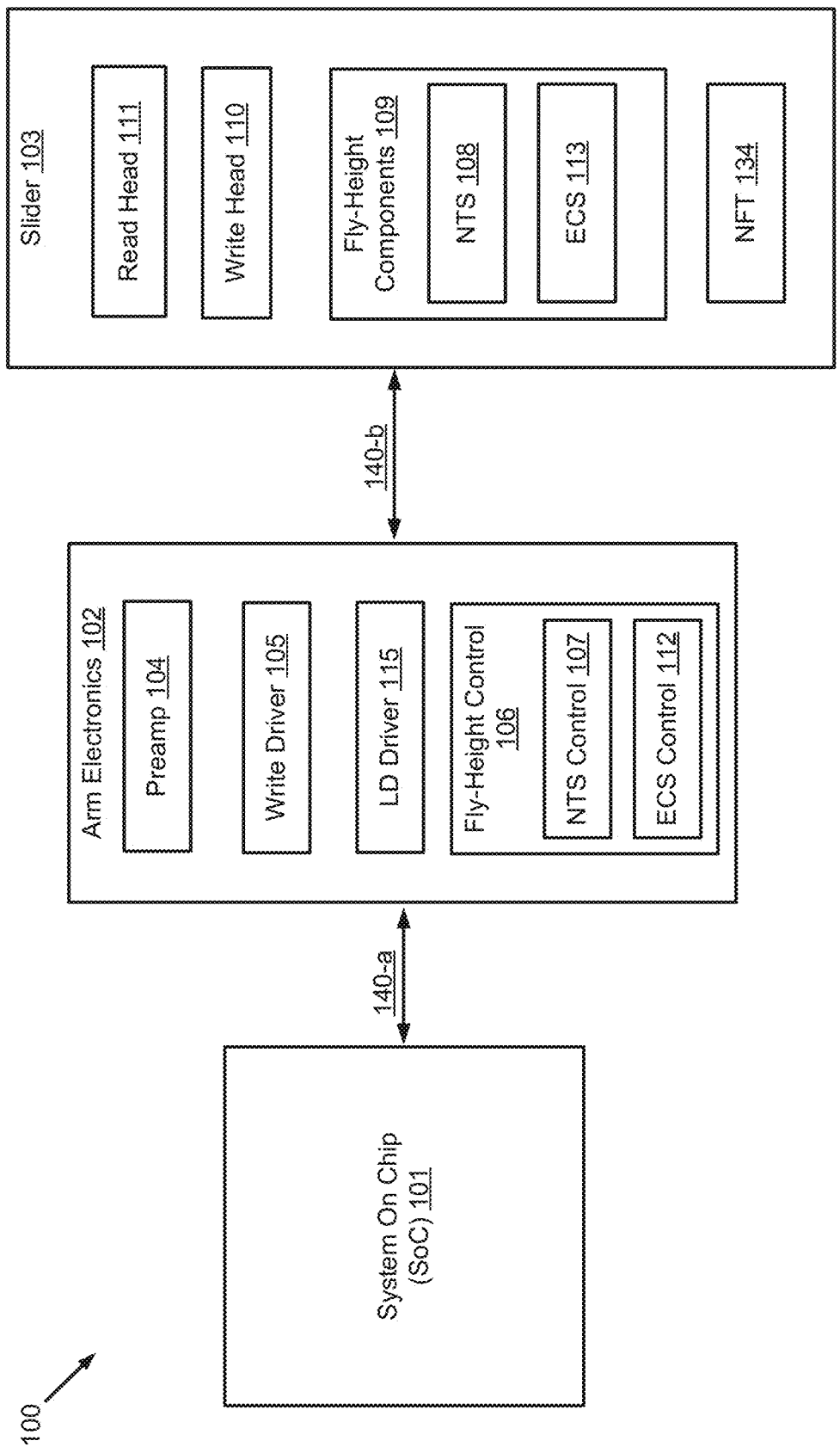
FIG. 1B shows a block diagram illustration of selected components of a disk drive, according to various aspects of the present disclosure.

A disk drive 100 according to various aspects of the disclosure, as seen in FIG. 1B, comprises a system on a chip (SoC) 101, where the SoC 101 comprises the electronics and firmware for the drive and used to control the functions of the drive including providing power and/or control signals to the components shown in arm electronics (AE) 102. Each disk (shown as disk 16 in FIG. 1C, disks 16A-D in FIG. 2B) can have thin film magnetic material on each of the planar surfaces. Each recording surface may comprise a dedicated pair of read and write heads packaged in a slider 103 that is mechanically positioned over the rotating disk by an actuator (e.g., shown as actuator assembly 19 in FIG. 2B). In some examples, the actuator(s) also provide the electrical connections to the slider 103 components. The actuator assembly 19 may also comprise the AE 102, the AE 102 comprising preamplifiers or preamps 104 (e.g., read and/or write preamp) for the heads (e.g., read head 111, write head 110), write driver 105, laser diode (LD) driver 115, and fly-height controls 106. In some examples, the fly-height control circuit 106 includes a near field transducer (NFT) temperature sensor (NTS) control circuit 107, for example, when the disk drive employs heat assisted magnetic recording (HAMR). The fly-height control circuit 106 may further include an embedded contact sensor (ECS) control circuit 112. In this example, the slider 103 can include fly-height components 109, where the fly-height components 109 include an NTS 108 and an ECS 113 in the slider 103. In other words, the HAMR drive 100 can include NTS 108 and ECS 113 in the slider 103 along the associated NTS control circuitry 107 and the ECS control circuitry 112, respectively, in the AE 102. It is noted that some of the components shown in AE 102 can be implemented or partially implemented in SoC 101, according to various aspects of the disclosure. While AE is shown as including preamps 104, AE inclusive of some or all of the functional blocks above other than preamps 104 may be implemented together in a preamp IC, and AE may be referred to as preamp IC 102 below.

As seen, a first connection (e.g., flex cable) 140-a connects the SoC 101 to the AE 102, while a second connection (e.g., flex cable) 140-b connects the AE 102 to the slider 103. The AE 102 typically include digital and analog circuitry that control the signals sent to the components in the slider 103 and process the signals received from the components of the slider 103. The AE 102 can include registers that are set using serial data from the SoC 101 to provide parameters for the AE functions. The write driver 105 generates an analog signal that is applied to an inductive coil in the write head 110 to write data by selectively magnetizing portions of the magnetic material on the surface of the rotating disk(s) 16. It is noted that while AE is so named as the electronic components are generally placed at the arm actuators in various embodiments, the actual physical location may vary in other embodiments.

As a disk rotates under a slider of a hard disk drive (HDD), the slider 103 is said to "fly" above the disk. In some cases, a thermal fly-height control (TFC) device (e.g., heater element) can be disposed within the slider 103 to contort the slider near the read and write transducers (or elements), and thereby vary the fly-height for the read and write transducers. In some examples, read and write elements or transducers reside in the slider 103 of the disk drive 100. In some cases, the disk drive 100 comprises fly-height control circuitry 106 that interfaces with fly-height components 109 in the slider 103. TFC is one example of a control technique that uses a heater element (not shown) disposed in the slider 103. The fly-height can be adjusted by heating the slider 103 with the heater. Electrical current supplied to the heater by fly-height control circuitry 106 generates heat to thermally expand the slider 103 and modulate the fly-height. As seen, the slider 103 also includes fly-height components 109 and the NTS 108. In some embodiments, the fly-height components 109 can also include other elements in addition to the heater.

In some cases, the disk drive 100 may utilize TFC of the read/write heads. One type of TFC uses an electrically resistive heater located on the slider 103 near the head (e.g., read head 111, write head 110). When current is applied to the heater, the heater expands and causes the head to expand and thus move closer to the disk surface (e.g., surface of disk 16 in FIG. 1C). The head can be adjusted to different heights, depending on whether the drive is reading or writing. In some examples, the TFC heater may be accurately calibrated so that the head-disk spacing can be controlled, where calibration may entail urging the head toward the disk until contact is made ("touchdown") at which point the slider is urged away from the disk ("pull-back"). In some cases, the ECS 113 embedded in the slider 103 near the write head 110 and/or read head 111, can be used to sense touchdown. The ECS 113 may include a metallic strip located at the slider air bearing surface (ABS) or gas bearing surface (GBS). The resistance of the ECS 113 may change in response to temperature changes (e.g., when the slider 103 temperature changes as it comes in close proximity to the disk). In this way, monitoring the voltage ($V_{ECS}$) across the ECS 113 can be used to determine touchdown.

Thus, the slider 103 includes write head 110 configured to write data to a disk (e.g., disk 16), a read head 111 configured to read data from the disk, fly-height components 109 configured to adjust slider fly-height (as described above) and a plurality of resistive temperature detectors (RTDs) for sensing the temperature near the ABS or GBS. In some cases, the plurality of RTDs may include at least a first RTD (e.g., NTS 108) and a second RTD (e.g., ECS 113). It is noted that ABS is generally used to describe the surface of the slider 103 facing the disk 16, where the disk drive could be filled with gases other than air (e.g., gases containing helium, nitrogen, to name two non-limiting examples) and that the use of the "ABS" term to describe various aspects of the disclosure is not intended to limit the disclosure to air filled drives. Accordingly, the term "gas bearing surface" or "GBS" can be used instead.

In some cases, the NTS 108 and/or ECS 113 is located proximate to the ABS and write head 110 (or alternatively the read head 111). The NTS 108 and/or ECS 113 facilitates detecting a temperature generated by the slider's proximity to the disk or media. In various embodiments, the NTS 108 and/or ECS 113 may comprise a thermal strip (e.g., metallic or semiconductor strip) on the slider 103. In some cases, the relative temperature at the ABS may be used to estimate the resistance, $R_{RTD}$, of the RTD, such as the ECS 113 or the NTS 108. Typically, the resistance of a material can be represented as a function of its intrinsic resistance and its dimensions (e.g., length, width, thickness or height).

In some cases, HAMR drives, such as disk drive 100, may utilize a laser source and optical waveguide with a NFT 134, where the NFT 134 may be located at the GBS (or ABS). Furthermore, the NTS 108 may be located near the NFT 134 for monitoring its temperature. In some cases, the NFT 134 employs "near field optics," and is optically coupled to the waveguide (e.g., waveguide 131 in FIG. 1C) of the HAMR drive, described in further detail below.

In some cases, a HAMR recording head (e.g., write head 110) may include optical components that direct light from a laser to the disk. During recording, a write element applies a magnetic field to a heated portion of the storage medium or disk 16, where the heat lowers the magnetic coercivity of the media, allowing the applied field to change the magnetic orientation of the heated portion. The magnetic orientation of the heated portion determines whether a one ('1') or a zero ('0') is recorded. Thus, by varying the magnetic field applied to the magnetic recording medium while it is moving, data can be encoded onto the medium. A HAMR drive (e.g., drive 100) employs a laser diode or LD (e.g., laser diode 128 in FIG. 1C) to heat the media to aid in the recording process. In some cases, the LD 128 is disposed within an LD cavity and is proximate to a HAMR read/write element 144, where the read/write element 144 has one end on the ABS of the slider 103. The ABS faces and is held proximate to a moving media surface (e.g., surface of disk 16) during operation of the HDD.

Figure 1C:
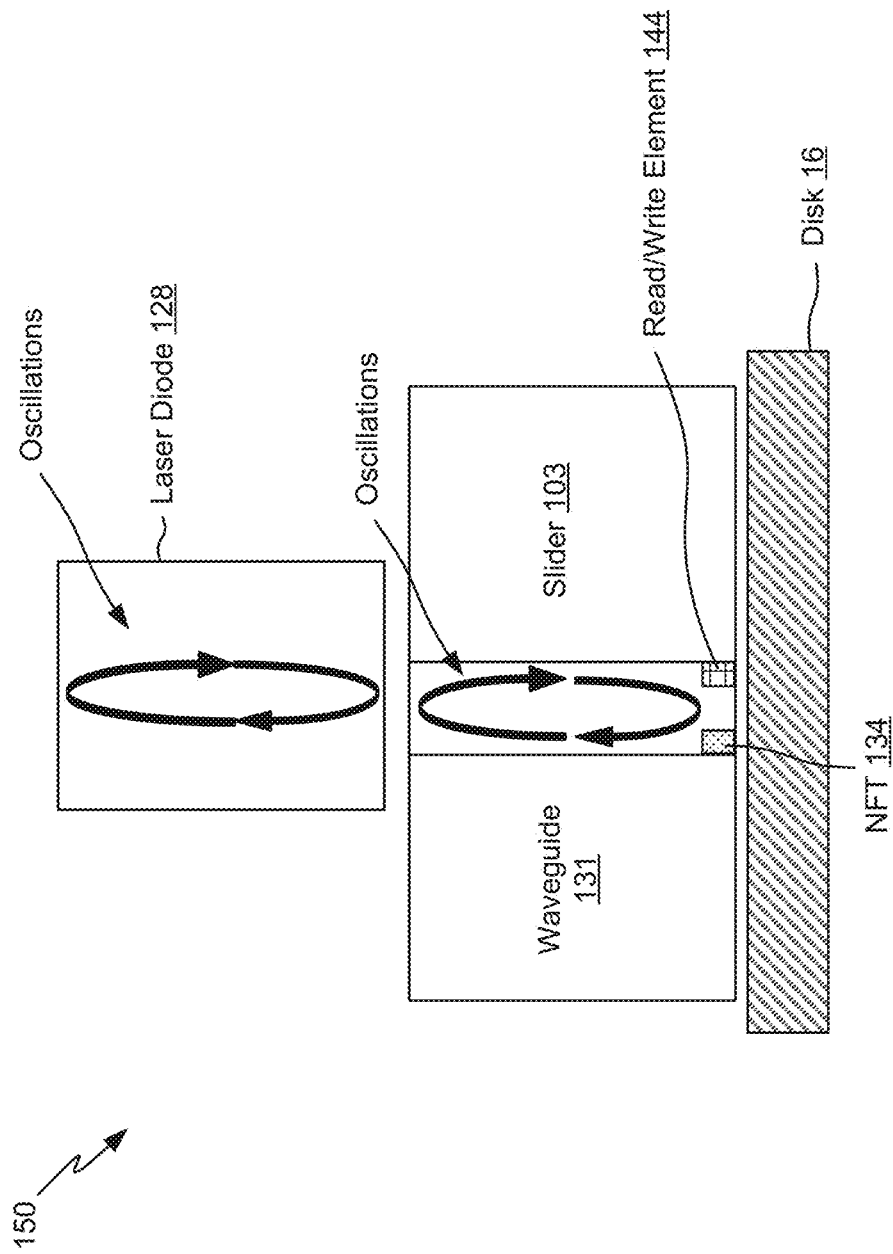
FIG. 1C illustrates a block diagram showing a waveguide, a laser diode, a disk, and a slider of a data storage device, according to various aspects of the present disclosure.

The LD 128 provides optical-based energy to heat the media surface, e.g., at a point near the read/write element 144. In some cases, optical path components, such as a waveguide 131, are formed integrally within the slider 103 to deliver light from the LD 128 to the NFT 134 which provides targeted heat to the media/disk. For example, as shown in FIG. 1C, a waveguide 131 and NFT 134 are located proximate to the read/write element 144 to provide local heating of the media or disk 16 during write operations. In some circumstances, various components (e.g., read/write element 144, NFT 134, LD 128, etc.) may experience significant heating due to light absorption and inefficiencies in electrical-to-optical energy conversion as energy produced by the LD 128 is delivered to the magnetic recording medium or disk 16. In some cases, for example, during the start of a write operation, the temperature of the LD experiences significant variations, causing a shift in laser emission wavelength. This in turn leads to a change of optical feedback from the optical path in the slider 103 to the LD cavity, resulting in mode hopping (i.e., power instability) of the LD 128. Mode hopping can degrade performance of HAMR drives, as mode hopping leads to shifting/jumping of laser output power leading to one or more of magnetic track width variations and magnetic transition shifting between data blocks. Large transition shifts in data blocks may increase errors, degrading disk drive performance and/or causing encroachment on adjacent data tracks.

In some instances, mode hop events can also lead to quick (e.g., <100 ns) changes in data phase relationships. Furthermore, mode hop events can cause the laser to be held in an underpowered state (or alternatively, an overpowered state) across multiple sectors of data. In such cases, this non-optimum laser power output can lead to overwrite or underwrite conditions. For instance, track width disturbances resulting from mode hop events may lead to overwrite or underwrite of adjacent data tracks. In such cases, hard read error events may occur if the overwrite or underwrite conditions are not adequately compensated for.

Some aspects of the present disclosure are directed to a technique for detecting mode hop events and compensating for the same to help maintain optimum laser write bias (or laser write power) in the presence of multiple LD temperature varying conditions, which can help enhance disk drive performance, as compared to the prior art.

In some embodiments, laser write bias ($LW_{Bias}$) can be adjusted based on using a feedback of a differential signal, such as differential NTS, herein referred to as a first level ($1^{st}$ level) laser power correction scheme, described below with reference to FIGS. 4 and 5. In such cases, the $LW_{Bias}$ can be adjusted based on comparing an average DNTS value (e.g., averaging DNTS measurements over two or more sectors) to a target DNTS value and adjusting (e.g., increasing, decreasing, or holding) the $LW_{Bias}$ to assist in mode hop compensation.

Figure 8:
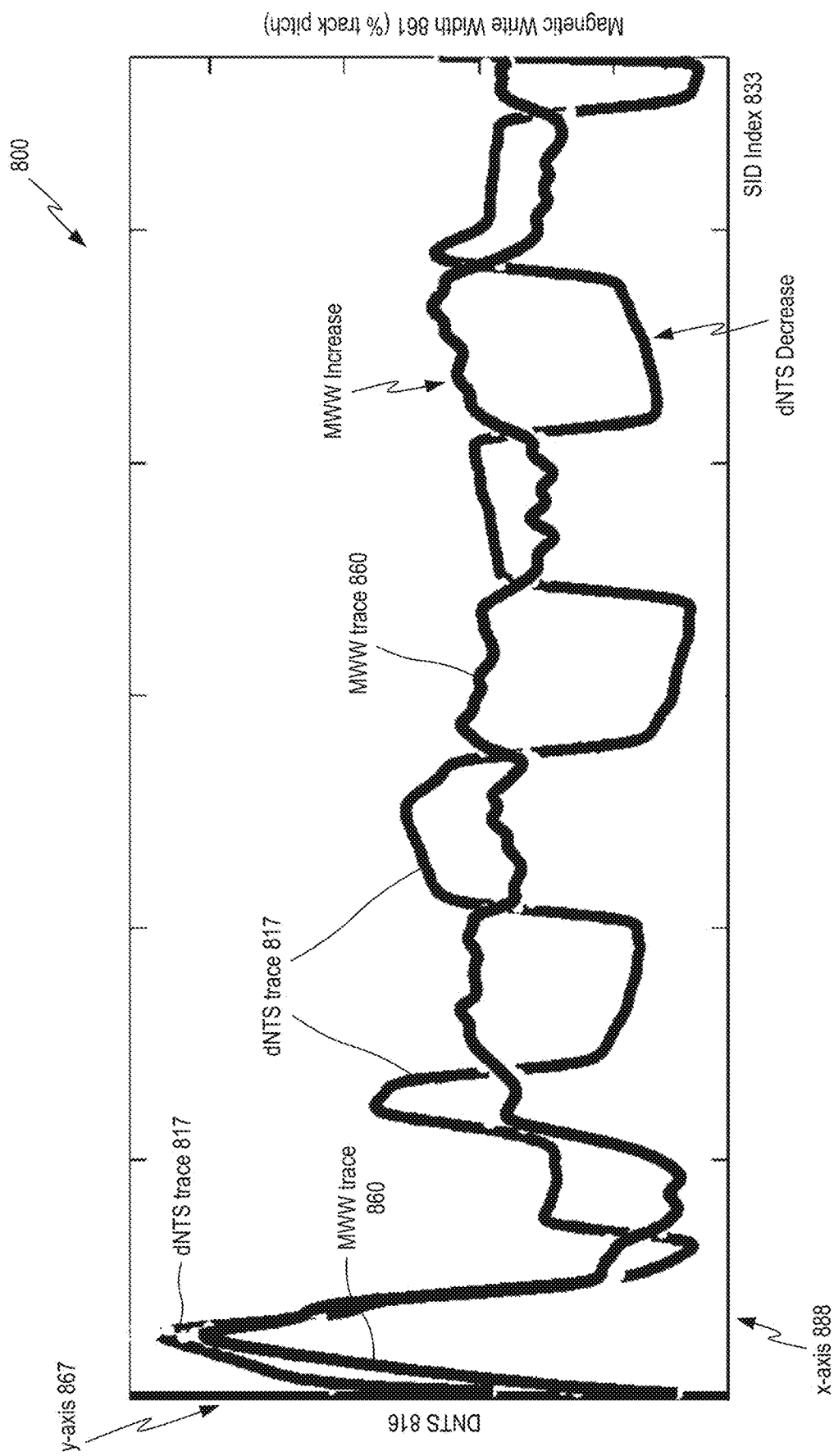
FIG. 8 is a conceptual graph showing how DNTS and magnetic write width (MWW) vary in relation to SID index in a HAMR drive, according to various aspects of the disclosure.

In some cases, a second level ($2^{nd}$ level) correction scheme may involve the use of the DNTS feedback information together with TFC compensation information (i.e., to compensate for fly height) to adjust the $LW_{Bias}$ for mode hop compensation, further described below with reference to FIGS. 6, 8, 9.

In some other cases, a third level ($3^{rd}$ level) correction scheme may involve the use of DNTS feedback information together with TFC compensation information (i.e., to compensate for fly height) and information related to a temperature change profile for the LD to adjust the $LW_{Bias}$ for mode hop compensation, further described below with reference to FIGS. 7 and 10.

It should be noted that one or more aspects of the present disclosure can be implemented using firmware (FW) control or internal preamp control. Furthermore, in some cases, aspects of the present disclosure may require minimal to no hardware (HW) modifications and may primarily involve modifications to the FW and/or preamp control.

Figure 2A:
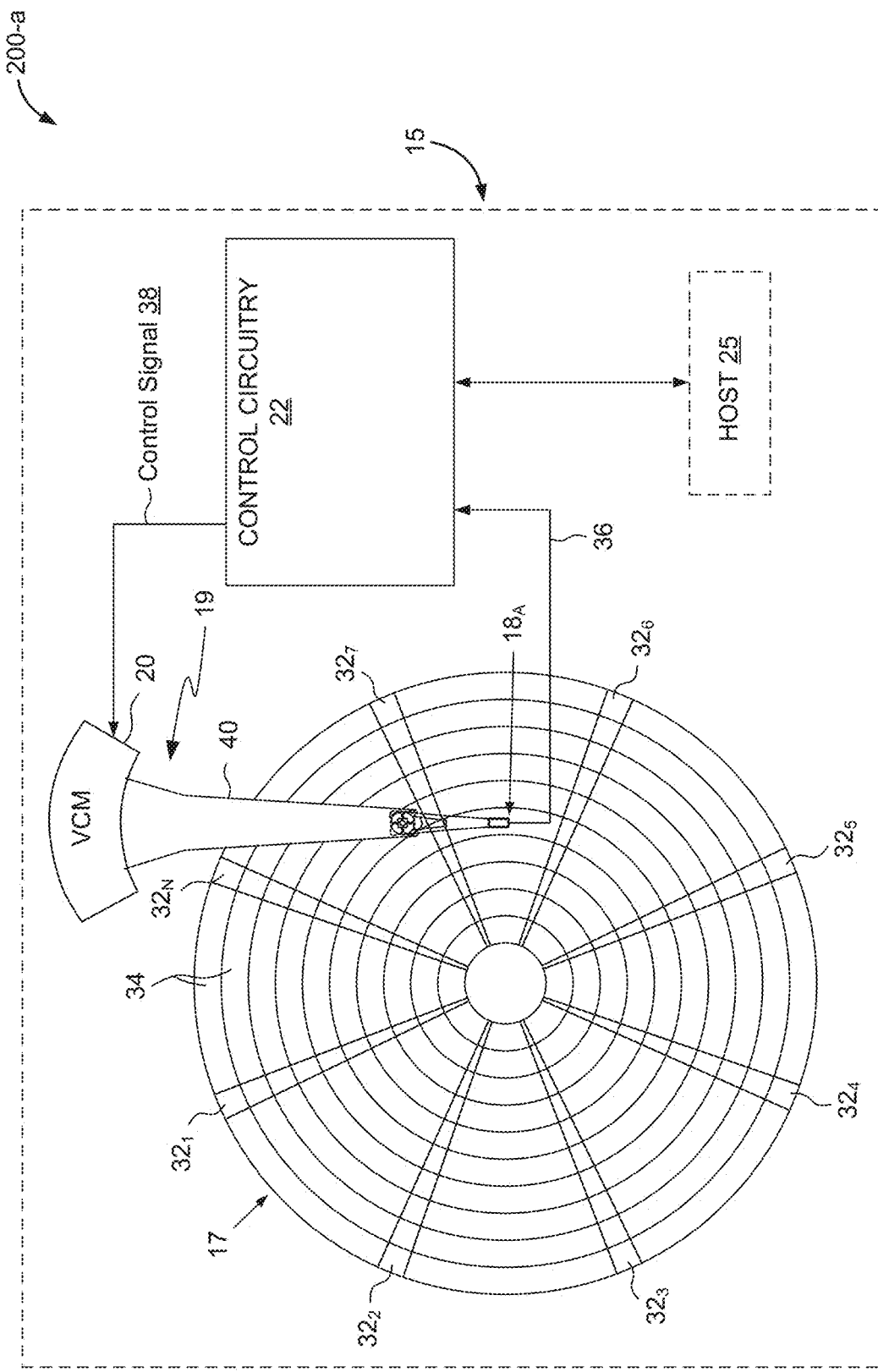
FIG. 2A is a conceptual block diagram of a top view of a data storage device in the form of a disk drive, according to various aspects of this disclosure.
Figure 2B:
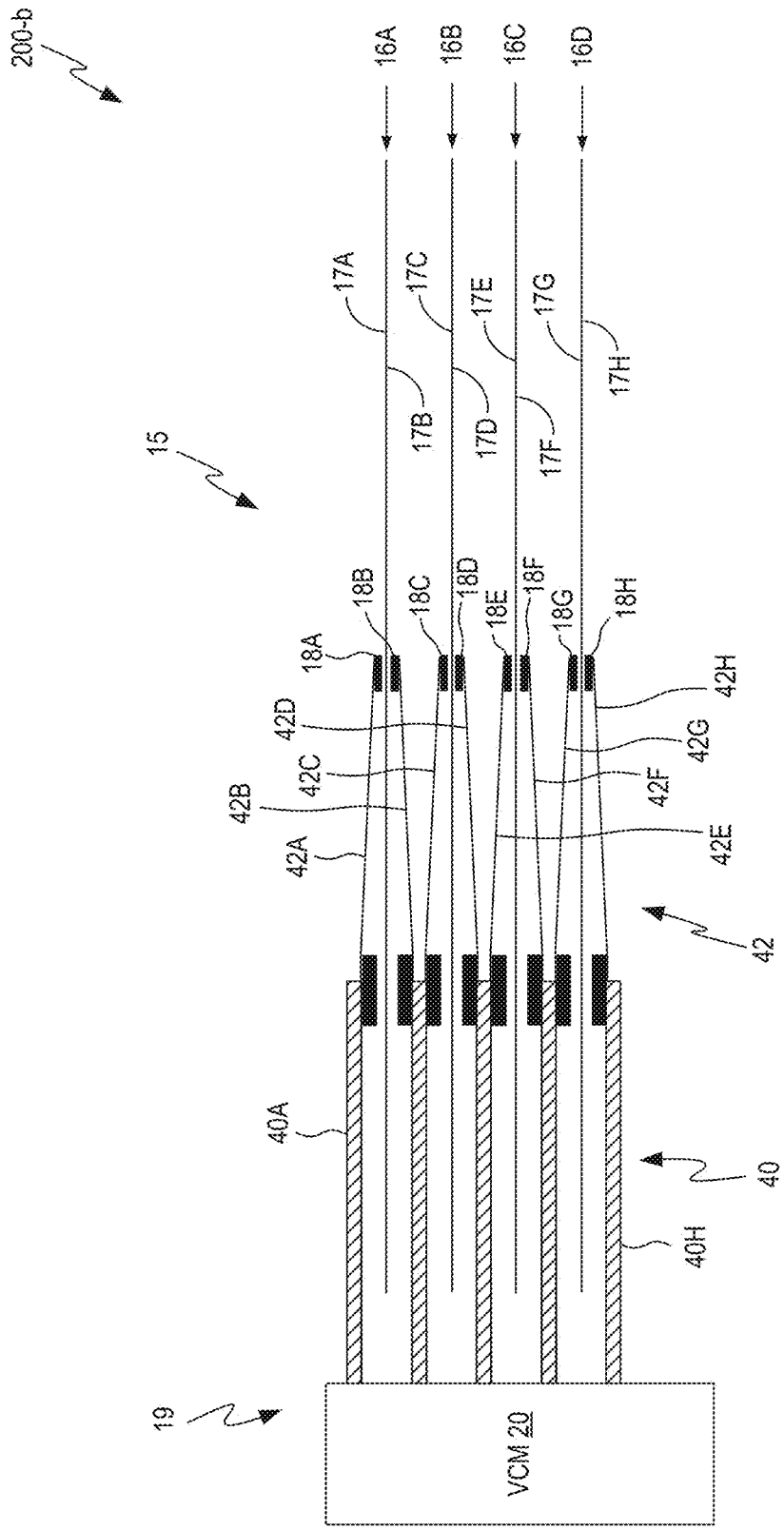
FIG. 2B is a conceptual block diagram of a side view of the data storage device in FIG. 2A, according to various aspects of this disclosure.
Figure 2C:
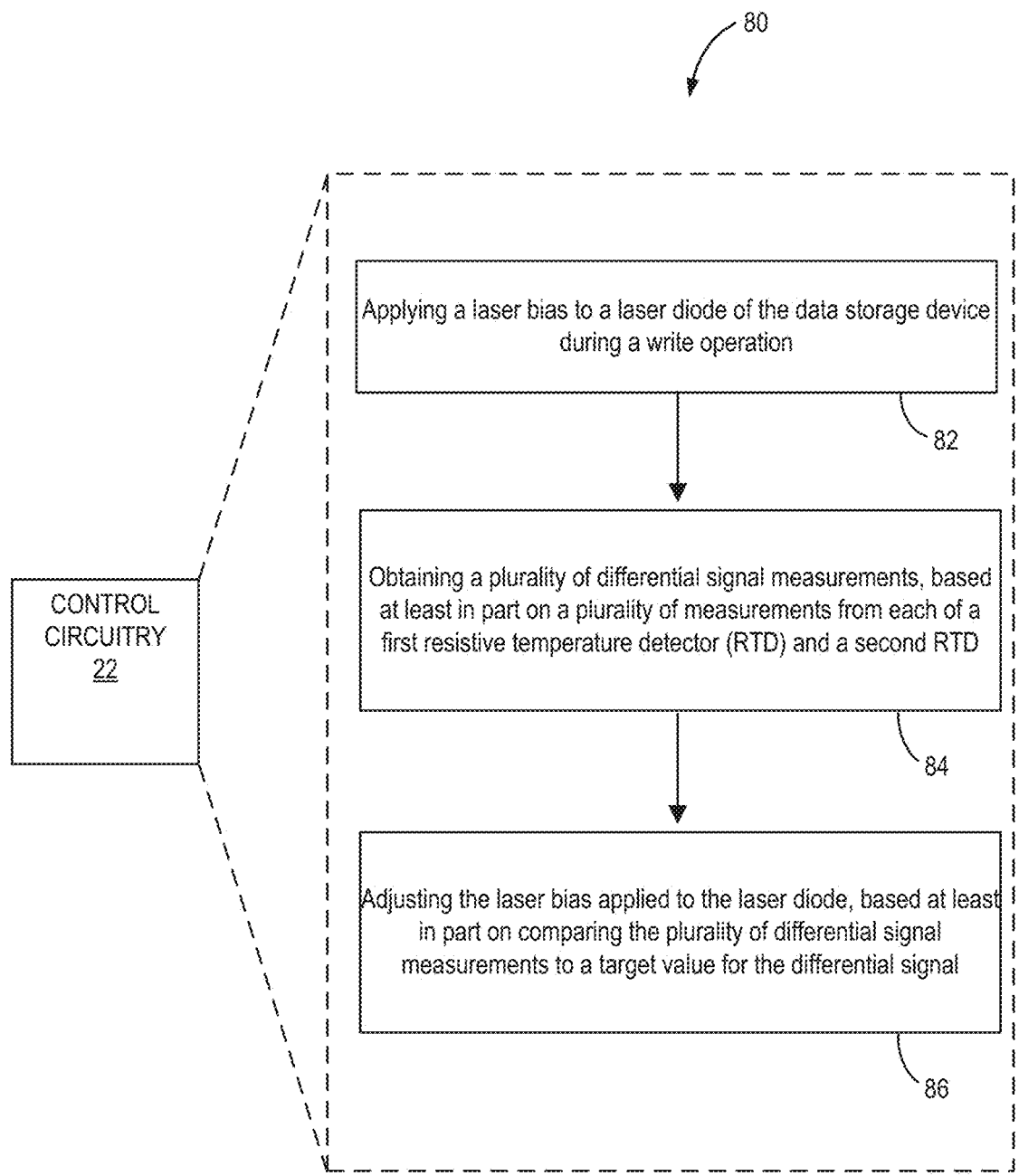
FIG. 2C is a flow diagram of a method that a data storage device may perform, execute, and implement, according to various aspects of this disclosure.

FIGS. 2A and 2B are conceptual top and side views 200-a and 200-b, respectively, of a data storage device in the form of disk drive 15, in accordance with various aspects of this disclosure. Disk drive 15 implements one or more aspects of the disk drives 100 and/or 150 described above in relation to FIGS. 1B and/or 1C, respectively. As seen in FIGS. 2A-2C, the disk drive 15 comprises control circuitry 22, actuator assembly 19, and a plurality of hard disks 16 (i.e., disks 16A, 16B, 16C, 16D).

Actuator assembly 19 is configured to position one or more heads 18 over disk surfaces 17 of one or more disks 16. Head(s) 18 comprise write and read elements, configured for writing and reading control features and/or data to and from a corresponding disk surface 17 (e.g., disk surfaces 17A, 17B, 17C, 17D, 17E, 17F, 17G, 17H) of disk(s) 16. In some cases, head(s) 18 may be similar or substantially similar to the read head 111 and/or write head 110 described in relation to FIG. 1B. As seen in the side view 200-b shown in FIG. 2B, actuator assembly 19 comprises primary actuator 20 (e.g., a voice coil motor ("VCM")) and a number of actuator arms 40 (e.g., topmost actuator arm 40A, lowest actuator arm 40H). Each actuator arm 40 comprises a head 18 at a distal end thereof (e.g., head 18A at a distal end of topmost actuator arm 40A in FIGS. 2A-2B). Each actuator arm 40 is configured to suspend a respective head 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). In the example shown in FIG. 2B, a suspension assembly 42 (e.g., suspension assembly 42A, suspension assembly 42B, suspension assembly 42C, suspension assembly 42D, suspension assembly 42E, suspension assembly 42F, suspension assembly 42G, suspension assembly 42H) is positioned at a distal end of a respective actuator arm 40, and a head 18 (e.g., head 18A, head 18B, head 18C, head 18D, head 18E, head 18F, head 18G, head 18H) is positioned at a distal end of a respective suspension assembly 42. Various examples may include a wide variety of other numbers of hard disks and disk surfaces, other numbers of actuator arm assemblies and primary actuators, other numbers of suspension assemblies, and/or other numbers of fine actuators on each actuator arm than those illustrated in FIGS. 2A-2B.

FIG. 2A also depicts servo sectors 32 (e.g., servo sectors $32_1$ through $32_N$) written onto disk surfaces 17 (e.g., disk surfaces 17A, 17B, 17C, 17D, 17E, 17F, 17G, 17H). Servo sectors 32 may be written to disk surfaces 17 to define a plurality of evenly-spaced, concentric tracks 34. Each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align a head 18 with and relative to a particular track 34. Each track 34 includes a plurality of embedded servo sectors 32 utilized in seeking and track following. Servo sectors 32 are spaced sequentially around the circumferences of circumferential tracks 34 and extend radially outward from the inner diameter (ID) of disk surface 17. Servo sectors 32 contain servo information utilized in seeking and track following and are interspersed between data regions on disk surfaces 17. Data is conventionally written in the data regions in a plurality of discrete data sectors. Each data region is typically preceded by a servo sector 32.

Control circuitry 22 may also process a signal 36 emanating from a head 18 to demodulate servo data written on the disk (e.g., servo sectors 32) to generate a position error signal (PES) representing an error between the actual position of the head and a target position relative to a target track. Control circuitry 22 may process the PES using a suitable servo control system to generate control signal 38 (e.g., a VCM control signal) applied to VCM 20 which rotates actuator arm 40 about a pivot in order to actuate head 18 radially over disk surface 17 in a direction that reduces the PES. In some embodiments, disk drive 15 may also comprise a suitable micro actuator, such as a suitable piezoelectric (PZT) element for actuating head 18 relative to a suspension (e.g., suspension assembly 42 in FIG. 2B), or for actuating a suspension relative to actuator arm 40.

Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

Each read/write head 18 is conventionally embedded in the trailing edge of a component known as a slider (e.g., slider 103 in FIGS. 1B and/or 1C). The slider in turn is affixed to a suspension (e.g., suspension assembly 42), which is found at the terminating end of actuator arm 40. As disk 16 spins at a high speed, the slider is lifted, or 'flies', above disk 16. It hovers on a thin layer of air (or gas), maintaining a stable distance measured in nanometers from disk surface 17. This minuscule distance permits read/write heads 18 to retrieve or store data while avoiding direct physical contact with disk surface 17, thereby preventing data corruption and potential damage to disk surface 17.

FIG. 2C is a flow diagram of a method 80 that control circuitry 22 of disk drive 15 may perform or execute in controlling the operations of disk drive 15, including the operations of HAMR components on heads 18 (e.g., heads 18A, 18B, 18C, 18D, 18E, 18F, 18G, and/or 18H) disposed on actuator assembly 19, as further described below. In particular, method 80 can help laser mode hop compensation using multi-sector feedback during HAMR, as will be described in detail below.

As seen, a first operation 82 of the method 80 may comprise applying a laser bias to a laser diode of the data storage device (e.g., HAMR drive) during a write operation.

In some cases, the laser diode may be coupled to a nearfield transducer, the nearfield transducer configured to heat an area of the disk near the read/write head. A second operation 84 may comprise obtaining a plurality of differential signal measurements, based at least in part on a plurality of measurements from each of a first resistive temperature detector (RTD) and a second RTD. In some cases, the first RTD may be an example of an NTS of a HAMR drive, while the second RTD may be an example of an ECS of the HAMR drive. In some examples, the second operation 84 may comprise subtracting a respective ECS measurement (e.g., $V_{ECS}$) from a respective NTS measurement (e.g., $V_{NTS}$) to determine a differential signal (or DNTS) measurement. A third operation 86 may comprise adjusting the laser bias applied to the laser diode, based at least in part on comparing the plurality of differential signal measurements (e.g., DNTS measurements) to a target value for the differential signal (e.g., $DNTS_{Target}$). In some cases, the differential signal is associated with the first RTD and the second RTD.

Figure 3A:
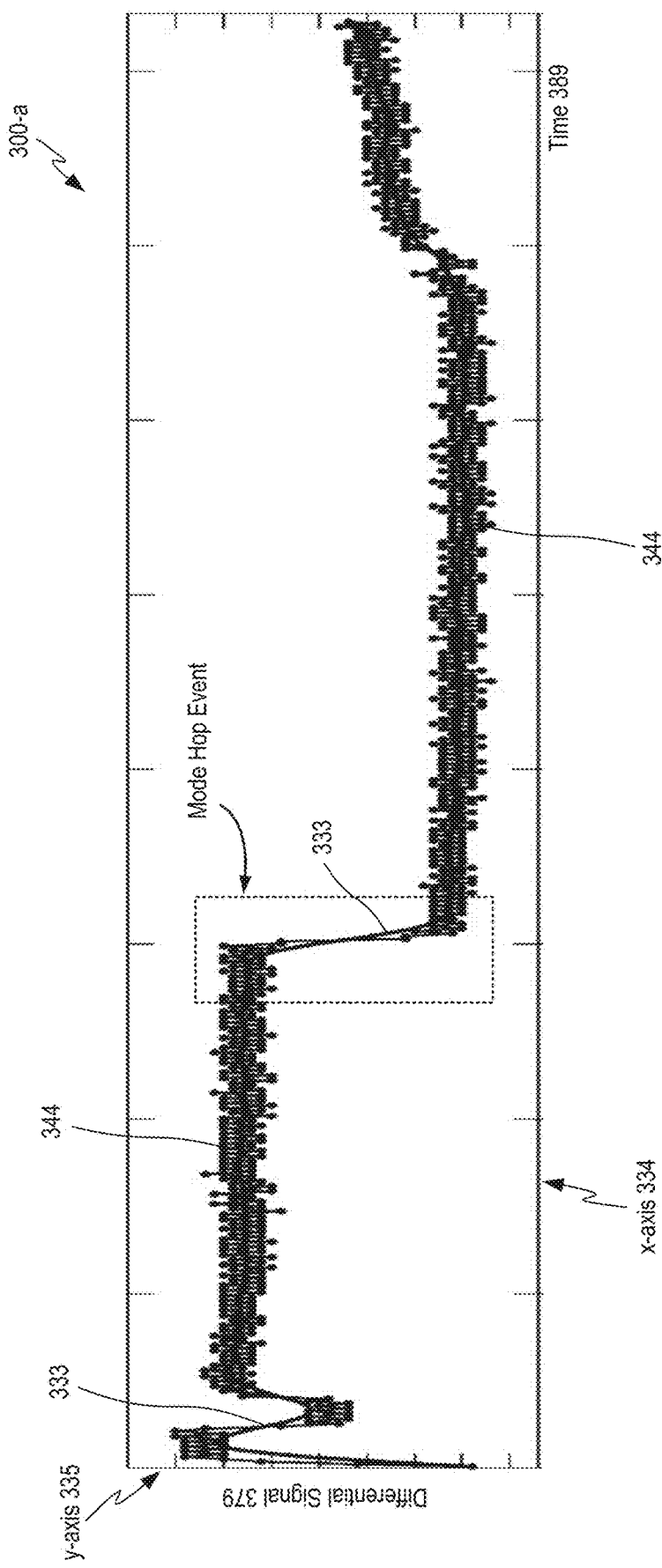
FIG. 3A is a conceptual graph showing a differential signal, such as DNTS, against time for a HAMR drive, according to various aspects of the disclosure.

Turning now to FIG. 3A, which illustrates a conceptual graph 300-a showing a differential signal 379 against time 389, according to various aspects of the disclosure. In some cases, the differential signal 379 comprises a differential NTS (DNTS) signal, where the DNTS signal corresponds to a difference between the NTS measurements (e.g., $V_{NTS}$ measured using NTS 108) and the ECS measurements ($V_{ECS}$ measured using ECS 113). In other words, DNTS=$V_{NTS}$−$V_{ECS}$. In FIG. 3A, time 389 is shown along horizontal or x-axis 334, while DNTS 379 (e.g., digital codes corresponding to the differential signal or DNTS) is shown along vertical or y-axis 335.

As noted above, mode hop events may be of a significantly shorter duration (e.g., <50 ns) than the time constant (e.g., ~1 µs) of the NTS element. This prohibits fast detection and/or recovery when mode hop events occur. In some cases, LD temperature changes (e.g., detected using the NTS 108) can cause track width disturbances, which can lead to underwriting or overwriting of adjacent tracks. If not compensated for, this can adversely impact HAMR drive performance.

Figure 3B:
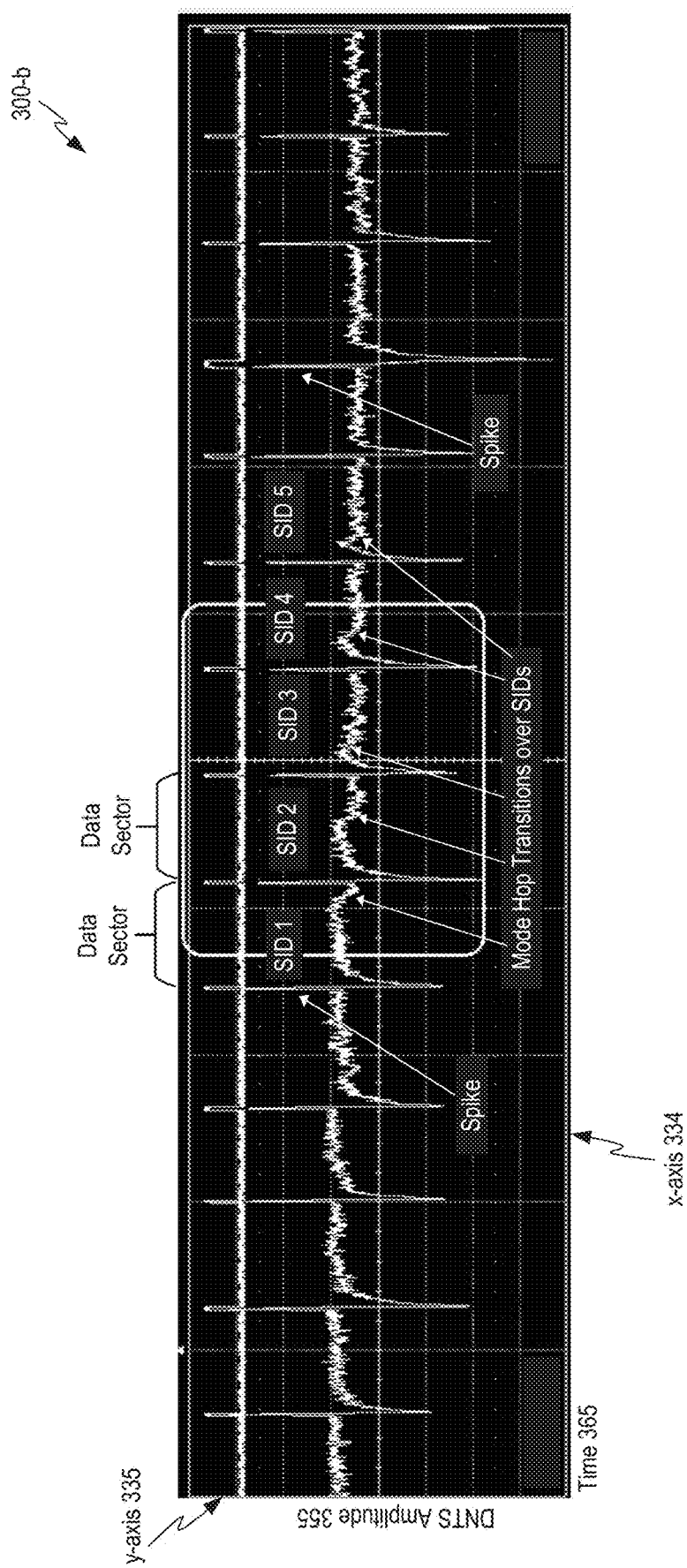
FIG. 3B is a conceptual graph depicting mode hop chatters over several sectors (or sector IDs (SIDs)) as the temperature of a laser diode changes, according to various aspects of the disclosure.

In some instances, mode hops can "chatter" over multiple sectors as the LD temperature changes, where the sectors may be associated with different sector IDs (or SIDs). Furthermore, to prevent erasure of servo data, the LD may be cooled (e.g., by backing off from supplying current to the LD) as the head passes over the servo sector. For instance, as shown in conceptual graph 300-b in FIG. 3B, amplitude 355 (e.g., DNTS amplitude) is shown along vertical or y-axis 335, while time 365 is shown along horizontal or x-axis 334. Specifically, but without limitation, FIG. 3B illustrates the mode hop chatters/transitions occurring over a plurality of sectors (e.g., a first sector associated with SID 1, a second sector associated with SID 2, a third sector associated with SID 3, a fourth sector associated with SID 4, a fifth sector associated with SID 5) due to the drop in LD temperature when the servo information is read from the sectors. In FIG. 3B, the amplitude spikes (e.g., spikes in DNTS measurements) occur as a result of the drop in LD temperature while reading servo information and/or while moving over a servo sector. In some instances, mode hop chatters may need to settle down before the laser bias (or laser current) can be adjusted. In some circumstances, each sector (or SID) may be around 15 µs long and the mode hop chatter may settle down after 5-6 sectors.

Figure 5:
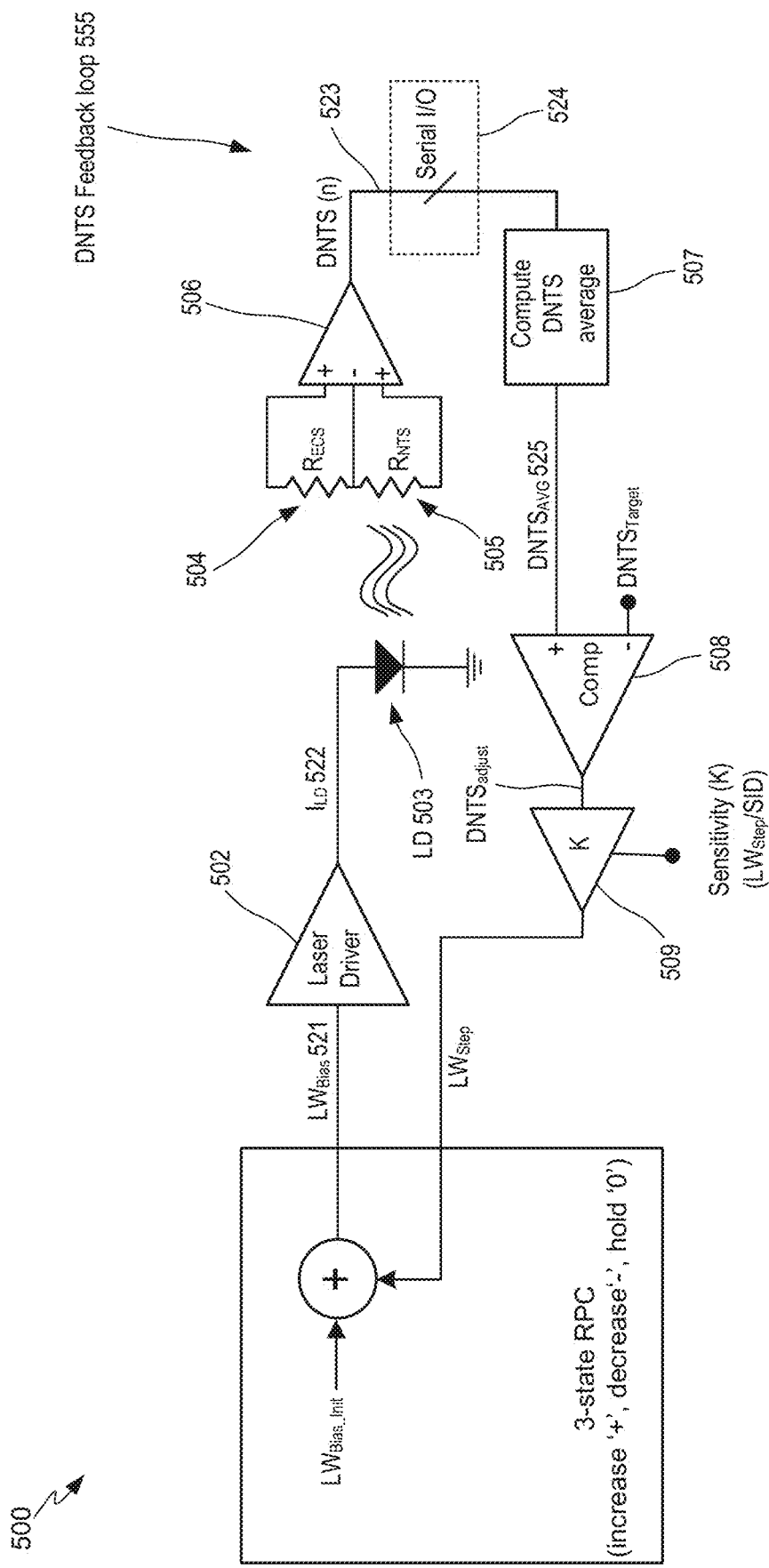
FIG. 5 is a block diagram of a control feedback loop for implementing the $1^{st}$ level laser power correction scheme described with reference to FIG. 4, according to various aspects of the disclosure.

Turning now to FIG. 5, which illustrates a block diagram 500 of a control feedback loop for implementing a $1^{st}$ level laser power correction scheme (or simply, $1^{st}$ level correction scheme), according to various aspects of the disclosure. Specifically, but without limitation, the block diagram 500 shows one non-limiting example of a DNTS feedback loop 555 that can be employed in a HAMR drive to implement a $1^{st}$ level laser power correction scheme.

In some cases, aspects of the present disclosure can utilize DNTS feedback information to adjust laser current (or laser bias), which can help compensate for mode hop events in HAMR. As shown in FIG. 5, the firmware (FW) can measure at least one DNTS value per SID, where each DNTS value is measured as a difference between the voltage measured across $R_{NTS}$ 505 and $R_{ECS}$ 504. In other words, each DNTS value is measured as a difference between a corresponding $V_{NTS}$ value and $V_{ECS}$ value, where $V_{NTS}$ and $V_{ECS}$ represent the voltage across $R_{NTS}$ 505 and $R_{ECS}$ 504, respectively. In some cases, the DNTS (523) is passed through an optional serial I/O 524 (shown as optional by the dashed lines), following which an average of the DNTS value(s) is computed (507). In some cases, the $DNTS_{AVG}$ 525 is computed based at least in part on sampling two DNTS values (523). That is, the DNTS is sampled at least twice to determine the $DNTS_{AVG}$ 525. For example, the $DNTS_{AVG}$ 525 can be computed by averaging DNTS values for two or more sectors. In some cases, the $DNTS_{AVG}$ 525 and a $DNTS_{Target}$ are input into a comparator 508. In some instances, the target value for the DNTS can be pre-determined and may be based on one or more of the head write current, laser current, temperature, and head fly-height control. In some examples, the $DNTS_{Target}$ may be specific to the read/write head. While not necessary, in some examples, the DNTS can be sampled towards the end of the servo sector, which can allow for more consistent results.

As shown in FIG. 5, the control feedback loop (500) can further include a sensitivity block 509, where the sensitivity parameter 'K' corresponds to the DNTS to laser bias ($LW_{Bias}$) sensitivity. In some examples, this DNTS to laser bias sensitivity (or K) may be pre-determined and may be expressed in terms of laser write step ($LW_{step}$) per sector or SID, i.e., $LW_{step}$/SID. The output of the comparator 508 can be passed through the sensitivity block 509 to determine a $LW_{step}$, where the $LW_{step}$ is combined with the initialized laser write bias ($LW_{Bias\_Init}$) to determine the $LW_{Bias}$ 521. As shown in FIG. 5, a 3-state rate predictive control (RPC) can be utilized, where the 3 states are 'increase', 'decrease', or 'hold'. In other words, the $LW_{Bias}$ 521 can have a higher value than $LW_{Bias\_Init}$ (increase), a lower value than $LW_{Bias\_Init}$, or the same or approximately the same value as $LW_{Bias\_Init}$ (hold). Further details on this 3-state control scheme are described below with reference to FIG. 11. In some examples, the $LW_{Bias}$ 521 corresponds to the laser write bias supplied to the laser driver 502. Furthermore, the laser driver 502 outputs a current, $I_{LD}$ 522, to drive the LD 503. In some examples, the $I_{LD}$ 522 is based at least in part on the $LW_{Bias}$ 521. In some cases, the $LW_{Bias\_Init}$ can be determined during the manufacturing process of the HAMR drive.

In this way, the DNTS feedback (e.g., per sector or SID) can be utilized to adjust the laser bias (or laser current) input to the laser driver 502, which can help for mode hop compensation. In some cases, the $LW_{step}$ output by the sensitivity block 509 can be positive (+), negative (−), or hold (0), and the $LW_{Bias\_Init}$ can be adjusted based on the $LW_{step}$. For instance, the $LW_{Bias}$ 521 can be higher than the $LW_{Bias\_Init}$ if $LW_{step}$ is '+', lower than $LW_{Bias\_Init}$ if $LW_{step}$ is '−', and the same or approximately the same if $LW_{step}$ is 'hold'.

It should be noted that the laser driver 502 (also shown as LD driver 115 in FIG. 1B) may be implemented in the AE or preamp IC 102 and may be used to drive the LD 503. In other embodiments, the LD 503 can be driven by other components within the broader control circuitry 22 in the HAMR drive such as the SoC 101 or other circuitry.

Figure 4:
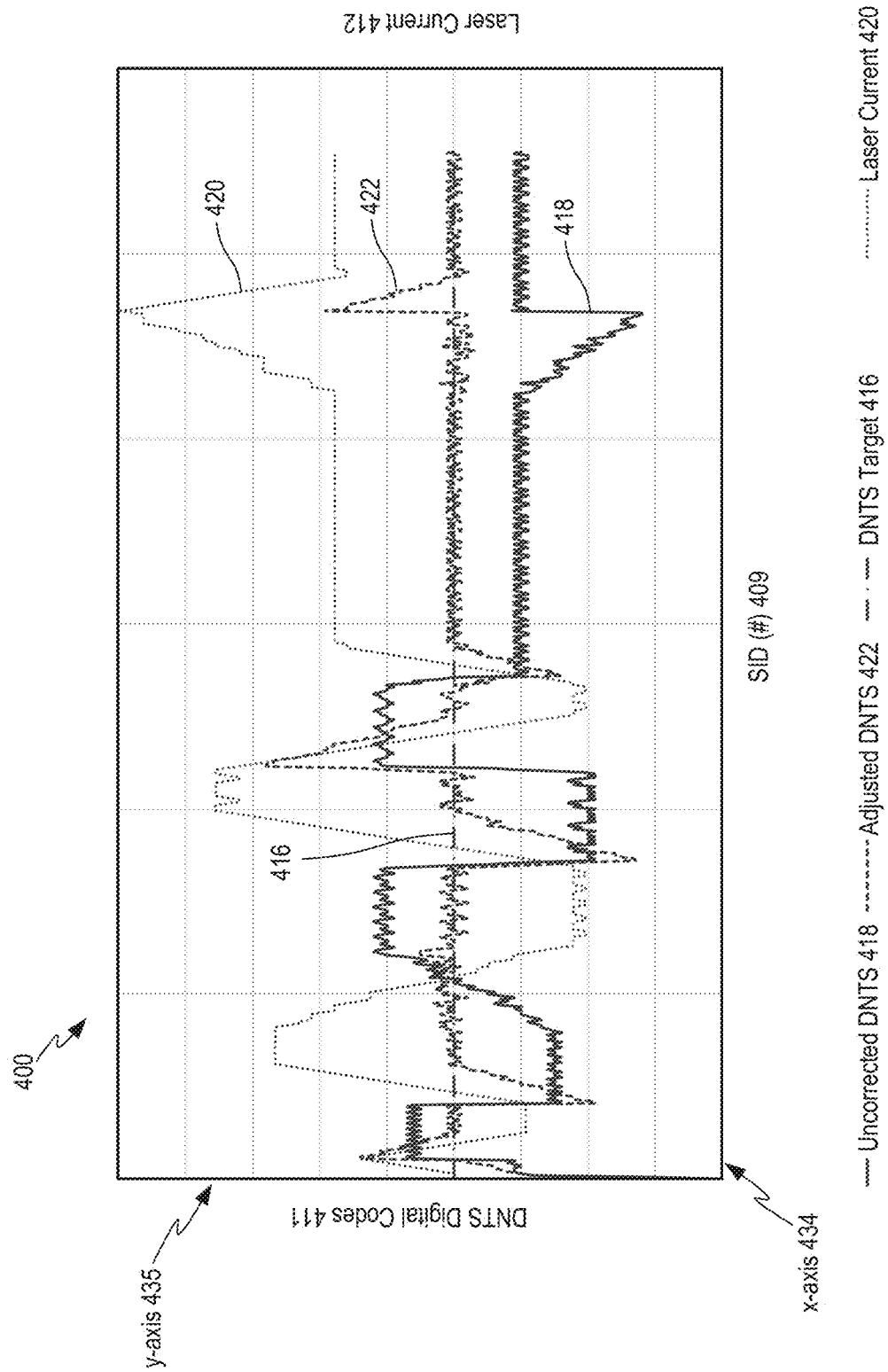
FIG. 4 is a conceptual graph showing various traces related to a $1^{st}$ level laser power correction scheme utilizing feedback of a differential signal, such as DNTS, for adjusting a laser bias applied to a laser diode, according to various aspects of the disclosure.

FIG. 4 illustrates a conceptual graph 400 showing a plurality of traces 416, 418, 420, and 422, according to various aspects of the disclosure. Specifically, graph 400 depicts how the DNTS digital codes 411 and laser current 412 vary in relation to SID number 409, for instance, over a full revolution of the disk. Here, DNTS digital codes 411 are depicted along the vertical or y-axis 435, laser current 412 is shown along the vertical or y-axis 435, and SID numbers 409 are shown along the horizontal or x-axis 434. Furthermore, graph 400 depicts a first trace 416 (DNTS Target), a second trace 418 (uncorrected DNTS), a third trace 420 (laser current), and a fourth trace 422 (corrected or adjusted DNTS).

As noted above, the laser current (420) can be adjusted based on comparing the DNTS feedback to the DNTS target (416). This allows for closer tracking of the DNTS target. For instance, the trace 422 corresponding to the adjusted DNTS more closely tracks (i.e., less DNTS error) the DNTS target (416) than the trace 418 corresponding to the uncorrected or non-adjusted DNTS. In some instances, the comparator 508 in FIG. 5 outputs a signal corresponding to the adjusted DNTS (422) to the sensitivity block 509, where the sensitivity block 509 outputs the $LW_{step}$ to adjust the laser bias (or laser current). In some instances, the spikes or sudden drops in the laser current trace 420 may be associated with mode hops. Sampling/monitoring the DNTS and comparing it to the DNTS target allows identification of these mode hops. Furthermore, as shown in FIG. 4, the laser current can be adjusted by determining the adjusted DNTS value and using the adjusted DNTS value to determine the $LW_{step}$ (or laser current correction), which allows for compensation of the mode hop(s). In this way, aspects of the present disclosure can utilize DNTS feedback to help optimize laser current (e.g., reduce long term laser current error), and thereby enhance HAMR drive performance as compared to the prior art.

Figure 6:
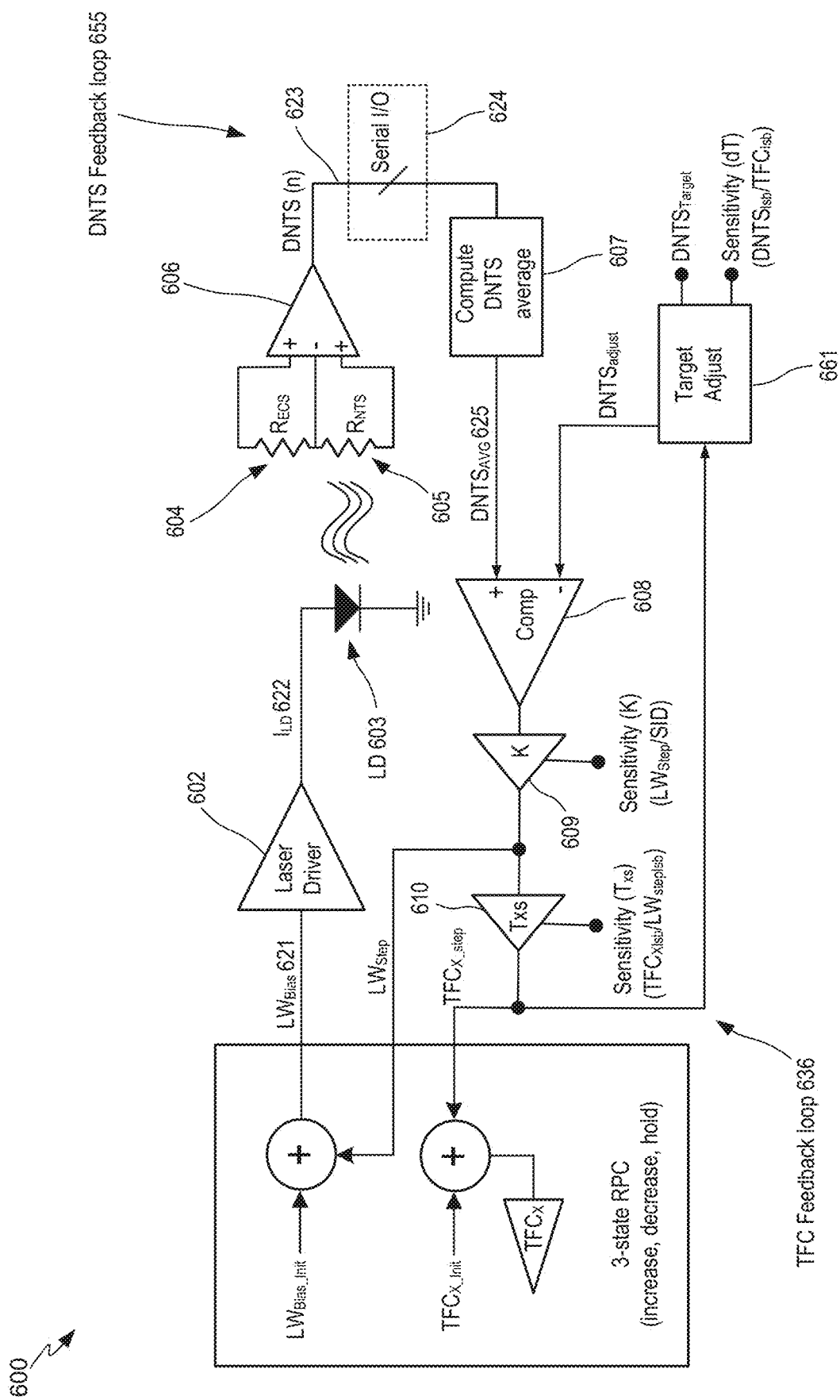
FIG. 6 is a block diagram of a control feedback loop for implementing a $2^{nd}$ level laser power correction scheme utilizing feedback of a differential signal, such as DNTS, along with fly-height compensation information for adjusting a laser bias applied to a laser diode, according to various aspects of the disclosure.

FIG. 6 illustrates a block diagram 600 of a control feedback loop for implementing a $2^{nd}$ level laser power correction scheme, according to various aspects of the disclosure. FIG. 8 is a conceptual graph 800 showing how DNTS and magnetic write width (MWW) vary in relation to SID index (e.g., over a full revolution of the disk) in a HAMR drive, according to various aspects of the disclosure. As noted above, MWW can be represented as a percentage (e.g., 90%, 100%, 115%, etc.) of the track pitch. Furthermore, FIG. 9 is a conceptual graph 900 showing various traces related to the $2^{nd}$ laser power level correction scheme described with reference to FIG. 6, according to various aspects of the disclosure.

Turning now to the block diagram 600 of the control feedback loop in FIG. 6. In some cases, aspects of the present disclosure can utilize DNTS feedback information in addition to fly-height compensation to adjust laser current (or laser bias), which can help compensate for mode hop events in HAMR drives. As shown in FIG. 6, the control circuitry 22 (or alternatively, the preamp or FW) can measure at least one DNTS value per sector (e.g., at least one DNTS value may be measured for each SID), where each DNTS value is measured as a difference between the voltage measured across $R_{NTS}$ 605 and $R_{ECS}$ 604. In other words, each DNTS value is measured as a difference between a corresponding $V_{NTS}$ value and $V_{ECS}$ value, where $V_{NTS}$ and $V_{ECS}$ represent the respective voltages across $R_{NTS}$ 605 and $R_{ECS}$ 604. In some cases, each DNTS value (623) is passed through an optional serial I/O 624 (shown as optional by the dashed lines). In some cases, the $DNTS_{AVG}$ 625 is computed (607) based at least in part on sampling two DNTS values (623). That is, the DNTS is sampled at least twice to determine the $DNTS_{AVG}$ 625. In one non-limiting example, the $DNTS_{AVG}$ 625 can be computed by averaging DNTS values for two or more sectors.

In some circumstances, the fly-height can be affected by laser current. Furthermore, the fly-height can be adjusted during normal operation of the HAMR drive, e.g., to compensate for changes in the separation distance between the head and the disk surface due to vibrations. In accordance with aspects of the present disclosure, dithering techniques (or other applicable techniques known in the art) can be used to measure the effects of laser current and/or TFC changes on DNTS and magnetic write width (MWW). For example, as shown in graph 800 in FIG. 8, a change in TFC (e.g., increase in TFC) can lead to an increase in MWW (e.g., measured as % of track pitch) and a decrease in DNTS. Specifically, an increase in TFC may cause a decrease in the DNTS due to the ECS heating up more than the NTS (i.e., since $DNTS=V_{NTS}-V_{ECS}$). In FIG. 8, MWW values 861 are shown along the vertical or y-axis on the right side of the page, while DNTS values 816 are shown along the vertical or y-axis 867 on the left side of the page. FIG. 8 also shows a DNTS trace 817 and a MWW trace 860 to help illustrate how the DNTS and MWW vary in relation to the SID index, where SID index 833 (e.g., corresponding to a full revolution of the disk) is shown along the horizontal or x-axis 888. In accordance with aspects of the present disclosure, the information (e.g., effects of laser current and/or TFC changes on DNTS and MWW) obtained from dithering the TFC can be utilized to calculate head TFC compensation with laser feedback corrections, described in further detail below.

In some embodiments, dithering may be used to determine the sensitivity parameter dT and/or the sensitivity parameter $T_{xs}$, described with reference to FIGS. 6 and/or 7. In some cases, dT corresponds to the ratio of the change in DNTS to the change in TFC and can be determined by modulating the TFC and measuring the corresponding DNTS. In some circumstances, the sensitivity dT may be measured for each head during the manufacturing process and stored as an input parameter for the DNTS target adjust block 661 and/or DNTS target adjust block 761. In some examples, the sensitivity parameter $T_{xs}$, which corresponds to the ratio of TFC change to laser current change, can also be determined using dithering techniques. For example, the sensitivity $T_{xs}$ can be determined by modulating the laser write bias ($LW_{Bias}$) and measuring the corresponding DNTS. This ratio of DNTS change to $LW_{Bias}$ change can be denoted DL, in which case the sensitivity $T_{xs}=DL/dT$.

Returning to FIG. 6, the laser driver 602 is configured to receive $LW_{Bias}$ 621 and output a current ($I_{LD}$ 622) to the LD 603. In some examples, the $LW_{Bias}$ 621 is based on $LW_{Bias\_Init}$ (initialized laser write bias or current, which may be determined during the manufacturing process), $LW_{step}$, where compared to FIG. 5, $LW_{step}$ is additionally based on a feedback loop output that takes into account TFC parameters. For example, as shown in FIG. 6, the block diagram 600 of the control feedback loop includes an additional TFC feedback loop 636 (i.e., in addition to the DNTS feedback loop 655). In some instances, the DNTS feedback loop 655 shown in FIG. 6 may implement one or more aspects of the DNTS feedback loop 555 in FIG. 5. In some embodiments, the $TFC_{x\_step}$ can be used to adjust the initialized TFC ($TFC_{X\_Init}$) to compensate for fly-height changes. Furthermore, the $DNTS_{Target}$ can be utilized to adjust the TFC value ($TFC_X$). For example, as shown in FIG. 6, the control feedback loop further includes a target adjust block 661, where the target adjust block 661 receives a $DNTS_{Target}$ and a sensitivity (dT), where the sensitivity (dT) corresponds to a relation between the least significant bit (LSB) of the DNTS and LSB of the TFC. That is, the sensitivity (dT) can be represented as $DNTS_{lsb}/TFC_{lsb}$. The target adjust block 661 outputs an adjusted DNTS ($DNTS_{adjust}$) to a comparator 608, where the comparator 608 compares the $DNTS_{adjust}$ to the $DNTS_{AVG}$ 625 received from block 607. In some examples, the output of the comparator 608 is input into the sensitivity block 609, where the sensitivity 'K' corresponds to the DNTS to laser bias ($LW_{Bias}$) sensitivity. In some examples, this sensitivity 'K' of block 609 may be predetermined and may be expressed in terms of laser write step ($LW_{step}$) per sector or SID, i.e., $LW_{step}$/SID. Similar to the 1st level correction scheme described with reference to FIG. 5, the sensitivity 'K' and the comparator 608 output are utilized to determine the $LW_{step}$.

As shown in FIG. 6, the control feedback loop (600) can include another sensitivity block 610, where the block 610 is associated with a sensitivity ($T_{XS}$). The sensitivity ($T_{XS}$) can be expressed in terms of $TFC_{X\_lsb}/LW_{step\_lsb}$ and can be utilized to determine the TFC adjustment. For instance, the output (e.g., $TFC_{X\_step}$) of the sensitivity block 610 is combined with (or added to) the initialized TFC value ($TFC_{X\_Init}$) to determine $TFC_X$. Furthermore, the output of the sensitivity block 610 is also fed back into the target adjust block 661. In such cases, the adjusted value for the DNTS (or $DNTS_{adjust}$) is based on the TFC adjustment (i.e., $TFC_{X\_step}$ or output of $T_{XS}$ sensitivity block 610), the sensitivity (dT), and the $DNTS_{Target}$. In some instances, the target value for the DNTS (e.g., shown as $DNTS_{Target}$ in FIG. 6) can be fixed and may be determined based on one or more of the head write current, laser current, temperature, and head fly-height control. In some examples, the $DNTS_{Target}$ may be specific to the read/write head. In some cases, however, this $DNTS_{Target}$ can be adjusted after each iteration, shown as $DNTS_{adjust}$. In other words, $DNTS_{adjust}$ is initially set to $DNTS_{Target}$ (e.g., for the first iteration), and this $DNTS_{adjust}$ is adjusted after each iteration.

As shown in FIG. 6, a 3-state RPC can be utilized, where the 3 states are 'increase', 'decrease', or 'hold'. In other words, the $LW_{Bias}$ 621 can have a higher value than $LW_{Bias\_Init}$ (increase), a lower value than $LW_{Bias\_Init}$, or the same or approximately the same value as $LW_{Bias\_Init}$ (hold). Similarly, the 3-state RPC can also be utilized to determine $TFC_X$ from $TFC_{X\_Init}$ and $TFC_{X\_step}$. For example, in some embodiments, the FW (or alternatively, the control circuitry 22 or preamp) may feedback an increase (+), decrease (−), or hold decision to update the TFC to compensate for fly-height. Furthermore, as described above, the $DNTS_{adjust}$ can be adjusted for the TFC. In some embodiments, the sensitivities, dT and $T_{XS}$, can be determined from dithering. Additionally, the laser voltage can be measured pre-write (i.e., prior to the write operation) for $DNTS_{Target}$ compensation. For instance, the AE 102 may measure the laser diode voltage prior to the start of write mode and use this measured LD voltage to set one or more of the $DNTS_{adjust}$ (e.g., in FIGS. 6 and/or 7) and $DNTS_{Temp\_Adjust}$ (e.g., in FIG. 7).

Similar to FIG. 5, the output of the comparator 608 can be passed through the sensitivity block 609 to determine a $LW_{step}$. This $LW_{step}$ can be added to the initialized laser write bias ($LW_{Bias\_Init}$) to determine the $LW_{Bias}$ 621, where the $LW_{Bias}$ 621 corresponds to the laser write bias supplied to the laser driver 602. The laser driver 602 then outputs a current, $I_{LD}$ 622, where $I_{LD}$ 622 is used to set the LD 603 power for write mode. In some cases, the $LW_{Bias\_Init}$ can be adjusted based on the $LW_{step}$, where the $LW_{step}$ output corresponds to a positive (+), negative (−), or hold decision. For instance, the $LW_{Bias}$ 621 can be higher than the $LW_{Bias\_Init}$ if $LW_{step}$ is '+', lower than $LW_{Bias\_Init}$ if $LW_{step}$ is '−', and the same or approximately the same as $LW_{Bias\_Init}$ if $LW_{step}$ is 'hold'. Additional details on this increase/decrease/hold control technique are described below with reference to FIG. 11.

In this way, the DNTS and TFC feedback can be utilized to not only adjust the laser bias (or laser current, $I_{LD}$ 622) input to the laser driver 602, but also the $DNTS_{adjust}$, which further allows updating/adjusting the TFC to compensate for fly-height.

Figure 9:
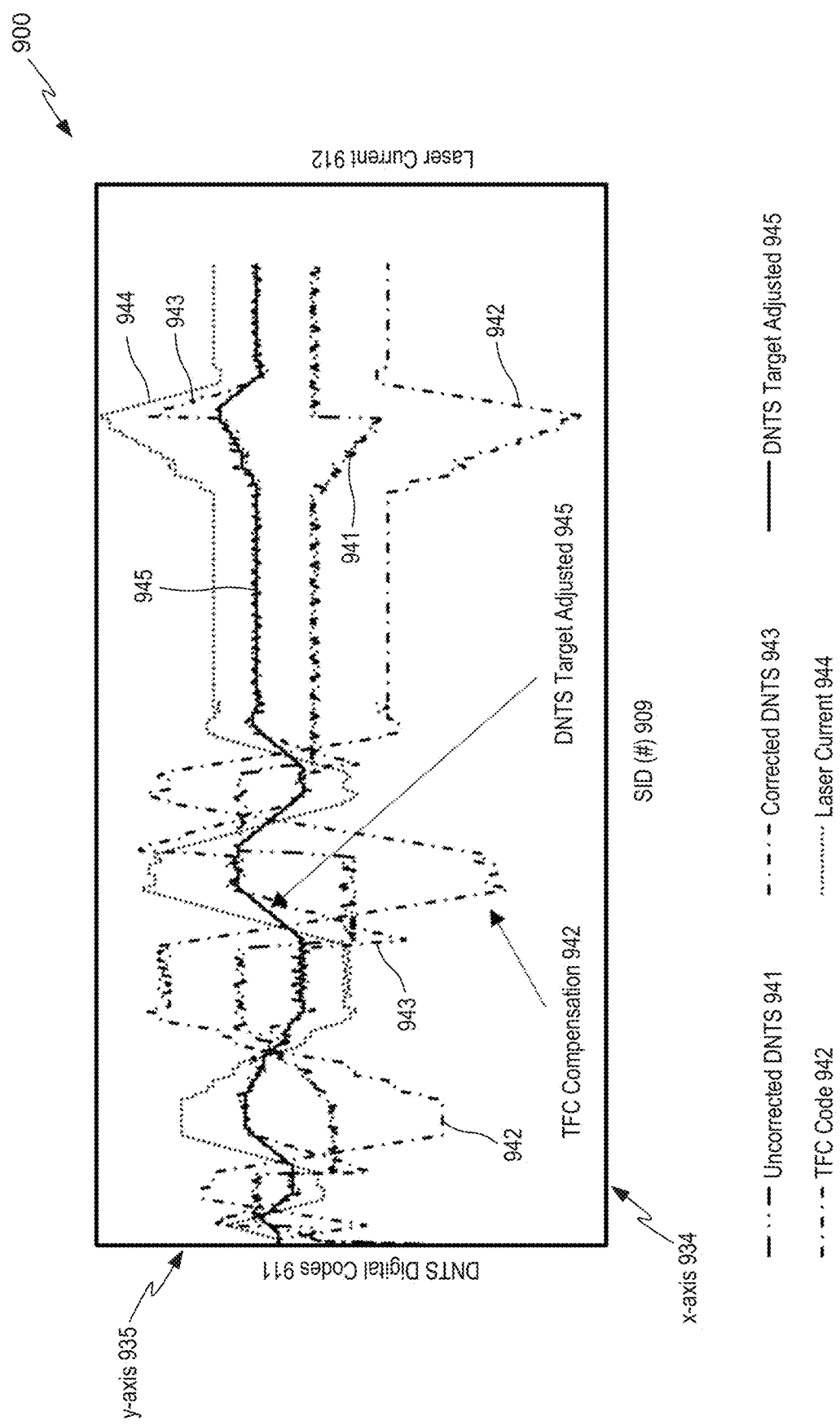
FIG. 9 is a conceptual graph showing various traces related to the $2^{nd}$ level laser power correction scheme described with reference to FIG. 6, according to various aspects of the disclosure.

FIG. 9 is a conceptual graph 900 showing various traces related to the $2^{nd}$ level laser power correction scheme described with reference to FIG. 6, according to various aspects of the disclosure. Specifically, but without limitation, graph 900 depicts how the DNTS digital codes 911 and laser current 912 vary in relation to SID number 909 (e.g., over a full revolution of the disk of the HAMR drive). Here, DNTS digital codes 911 and laser current 912 are depicted along the vertical or y-axis 935, and SID numbers 909 are shown along the horizontal or x-axis 934. Furthermore, graph 900 depicts a first trace 941 (uncorrected DNTS), a second trace 942 (TFC code), a third trace 943 (corrected or adjusted DNTS), a fourth trace 944 (laser current), and a fifth trace 945 (DNTS target adjusted). The graph 900 in FIG. 9 also shows adjustment of the DNTS target in response to TFC compensation, in accordance with various aspects of the disclosure.

Figure 7:
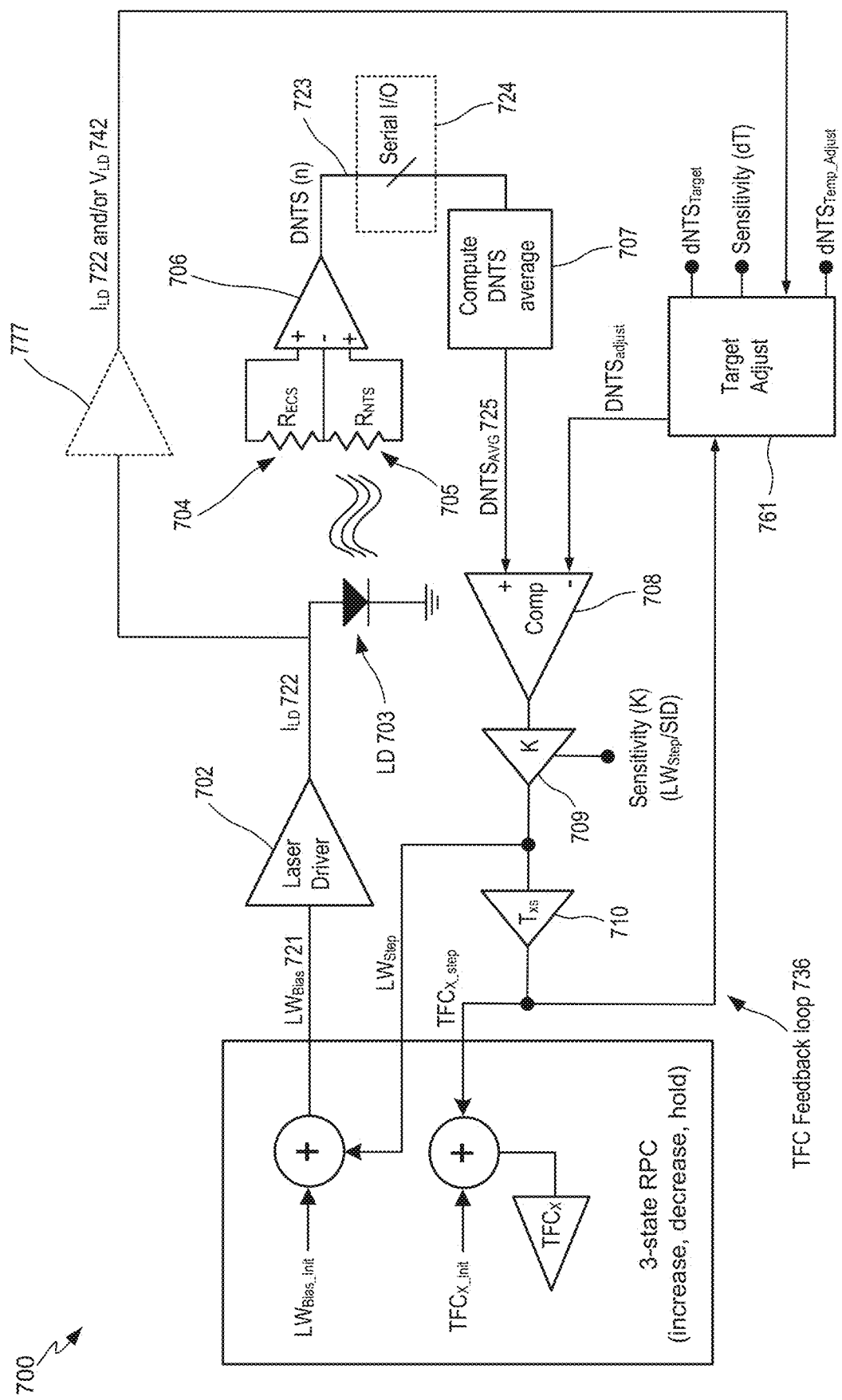
FIG. 7 is a block diagram of a control feedback loop for implementing a $3^{rd}$ level laser power correction scheme utilizing feedback of a differential signal, such as DNTS, along with fly-height compensation information and a temperature change profile for the laser diode for adjusting a laser bias applied to the laser diode, according to various aspects of the disclosure.

FIG. 7 illustrates a block diagram 700 of a control feedback loop for implementing a $3^{rd}$ level laser power correction scheme, according to various aspects of the disclosure. Furthermore, FIG. 10 is a conceptual graph 1000 showing various traces related to the $3^{rd}$ level laser power correction scheme described with reference to FIG. 7, according to various aspects of the disclosure.

Turning now to the block diagram 700 of the control feedback loop in FIG. 7. In some cases, aspects of the present disclosure can utilize DNTS feedback information in addition to fly-height compensation information to adjust the DNTS target and laser current (or laser write bias), which can help compensate for mode hop events in HAMR. As noted above with reference to FIG. 6, the TFC can be adjusted to compensate for fly-height changes, where the TFC adjustments are based on the sensitivity $T_{xs}$ (710), the sensitivity K (709), the $DNTS_{AVG}$ 725 and $DNTS_{adjust}$. For example, the TFC adjustment may be calculated based on $T_{xs}*K*(DNTS_{AVG}-DNTS_{adjust})$. Additionally, the $DNTS_{adjust}$ can be adjusted for the TFC using the TFC feedback loop(s) 636 and/or 736 shown in FIGS. 6 and/or 7, respectively. In some embodiments, the adjustment of the $DNTS_{adjust}$ can additionally be based on a temperature change profile of the laser diode (e.g., LD 703 in FIG. 7), described in further detail below.

As shown in FIG. 7, the control circuitry 22 (or alternatively, the preamp or FW) can measure at least one DNTS value per sector (or SID), where each DNTS value is measured as a difference between the voltage measured across $R_{NTS}$ 705 and $R_{ECS}$ 704. In other words, each DNTS value is measured as a difference between a corresponding $V_{NTS}$ value and $V_{ECS}$ value, where $V_{NTS}$ and $V_{ECS}$ represent the respective voltages across $R_{NTS}$ 705 and $R_{ECS}$ 704. In some cases, each DNTS value (723) is passed through an optional serial I/O 724 (shown as optional by the dashed lines). In some cases, the $DNTS_{AVG}$ 725 is computed (707) based at least in part on sampling and averaging two DNTS values (723). That is, the DNTS is sampled at least twice to determine the $DNTS_{AVG}$ 725. in some examples, the DNTS can be sampled at or near the end of the servo sector, which can allow for more consistent results. Furthermore, the $DNTS_{AVG}$ 725 can be computed by averaging DNTS values for two or more sectors.

In accordance with aspects of the present disclosure, the TFC can be dithered to obtain information related to one or more of the effects of laser current and/or TFC changes on DNTS and MWW. This information can then be utilized to calculate head TFC compensation with laser feedback corrections, as described above with reference to FIG. 6. In some cases, the laser driver 702 is configured to receive $LW_{Bias}$ 721 and output a current ($I_{LD}$ 722), where the current $I_{LD}$ 722 is used to drive the LD 703. In some examples, the $LW_{Bias}$ 721 is based on an initialized laser write bias or current ($LW_{Bias\_Init}$) and $LW_{step}$, where $LW_{step}$ corresponds to the adjustment (e.g., increase, decrease, or hold) to the laser write bias. Similar to the control scheme described with reference to FIG. 6, the $LW_{step}$ can be additionally based on a feedback output that considers TFC parameters (e.g., shown by TFC feedback loop 736). As noted above, the initialized laser write bias can be determined during the manufacturing stage of the HAMR drive. In some embodiments, the TFC can be adjusted to compensate for fly-height changes, for instance, by updating the initial TFC ($TFC_{X\_Init}$). Furthermore, the $DNTS_{Target}$ and/or $DNTS_{adjust}$ can also be utilized to determine the adjusted TFC value ($TFC_X$).

For example, as shown in FIG. 7, the control feedback loop further includes a target adjust block 761, where the target adjust block 761 receives a $DNTS_{Target}$ and a sensitivity (dT), where the sensitivity (dT) is represented as $DNTS_{lsb}/TFC_{lsb}$. The target adjust block 761 outputs an adjusted DNTS to a comparator 708, where the comparator 708 compares $DNTS_{adjust}$ to the $DNTS_{AVG}$ 725 (i.e., computed at block 707) to determine whether the $DNTS_{AVG}$ 725 has deviated from the $DNTS_{adjust}$ (or alternatively, the $DNTS_{Target}$), which may be indicative of a mode hop event. In some examples, the output of the comparator 708 is input into the sensitivity block 709, where the sensitivity 'K' corresponds to the DNTS to $LW_{Bias}$ sensitivity. For example, the sensitivity 'K' can be expressed in terms of $LW_{step}/SID$. The control feedback loop (700) can utilize another sensitivity $T_{XS}$ (710), where the sensitivity ($T_{XS}$) is expressed in terms of $TFC_{X\_lsb}/LW_{step\_lsb}$ and is utilized to determine the TFC adjustment (or $TFC_{X\_step}$). In one non-limiting example, the $LW_{step}$ together with the sensitivity ($T_{xs}$) can be used to determine $TFC_{X\_step}$. Furthermore, this $TFC_{X\_step}$ is combined with (or added to) the initialized TFC value ($TFC_{X\_Init}$) to determine $TFC_X$. As shown in the FIG. 7, the TFC feedback loop 736 allows this $TFC_{X\_step}$ to be fed back into the target adjust block 761. In this way, the $DNTS_{adjust}$ may be adjusted for TFC.

In some embodiments, a $DNTS_{Temp\_Adjust}$ value is also input into the target adjust block 761. This $DNTS_{Temp\_Adjust}$ value may be associated with a temperature rise profile of the LD 703 and may be calibrated or determined (e.g., per head) during the manufacturing stage of the HAMR drive. Thus, as seen in FIG. 7, the DNTS target may be adjusted (shown as $DNTS_{adjust}$) based on the $DNTS_{Target}$, the sensitivity (dT), the $DNTS_{Temp\_adjust}$, and/or the laser diode voltage ($V_{LD}$ 742). In some instances, the $V_{LD}$ 742 across the LD 703 can be monitored and passed through an optional amplifier 777 (e.g., op-amp) before being fed into the target adjust block 761. Additionally, or alternatively, the $I_{LD}$ 722 can be monitored and fed back into the target adjust block 761. In some instances, the initial target value for the DNTS (e.g., shown as $DNTS_{Target}$ in FIG. 7) may be determined based on one or more of the head write current, laser current (i.e., $LW_{Bias}$), temperature (e.g., disk drive temperature), and head fly-height control (e.g., based on $TFC_X$). In some examples, this initial $DNTS_{Target}$ value may be specific to the read/write head. In some cases, however, the $DNTS_{adjust}$ can be adjusted after each iteration (e.g., based on the feedback from the $TFC_{X\_step}$ adjustment) and/or based on the temperature rise profile of the LD. In one non-limiting example, the $DNTS_{adjust}$ may initially be set to the $DNTS_{Target}$ and adjusted after each iteration. Additionally, or alternatively, the $DNTS_{adjust}$ and/or the $DNTS_{Temp\_Adjust}$ values may be updated based on comparing the $V_{LD}$ 742 measurement to a $V_{LD}$ measurement obtained pre-write. In some cases, the $V_{LD}$ measurement obtained at pre-write time may be used to calibrate the $DNTS_{Temp\_Adjust}$ value.

In some embodiments, the FW (or alternatively, the control circuitry 22 or preamp) may feedback an increase (+), decrease (−), or hold decision to update the TFC to compensate for fly-height changes. Furthermore, as described above, the $DNTS_{adjust}$ can be adjusted for the TFC, as well as the temperature change (or rise) profile for the LD 703. In some embodiments, one or more of the sensitivities (e.g., dT, $T_{XS}$) can be determined from dithering (e.g., TFC dithering). Furthermore, the laser voltage (e.g., $V_{LD}$) can be measured pre-write (i.e., prior to the write operation) for $DNTS_{adjust}$ compensation and/or for adjusting the value of $DNTS_{Temp\_Adjust}$.

Similar to FIGS. 5 and 6, the output of the comparator 708 can be passed through the sensitivity block 709 to determine a $LW_{step}$. This $LW_{step}$ can be added to the initialized laser write bias ($LW_{Bias\_Init}$) to determine the $LW_{Bias}$ 721, where the $LW_{Bias}$ 721 corresponds to the laser write bias supplied to the laser driver 702. The laser driver 702 then outputs a current, $I_{LD}$ 722, to drive the LD 703. In some cases, the $LW_{Bias\_Init}$ can be adjusted based on the $LW_{step}$, where the $LW_{step}$ output corresponds to a positive (+), negative (−), or hold decision. For instance, the $LW_{Bias}$ 721 can be higher than the $LW_{Bias\_Init}$ if $LW_{step}$ is '+', lower than $LW_{Bias\_Init}$ if $LW_{step}$ is '−', and the same or approximately the same as $LW_{Bias\_Init}$ if $LW_{step}$ is 'hold'.

Figure 10:
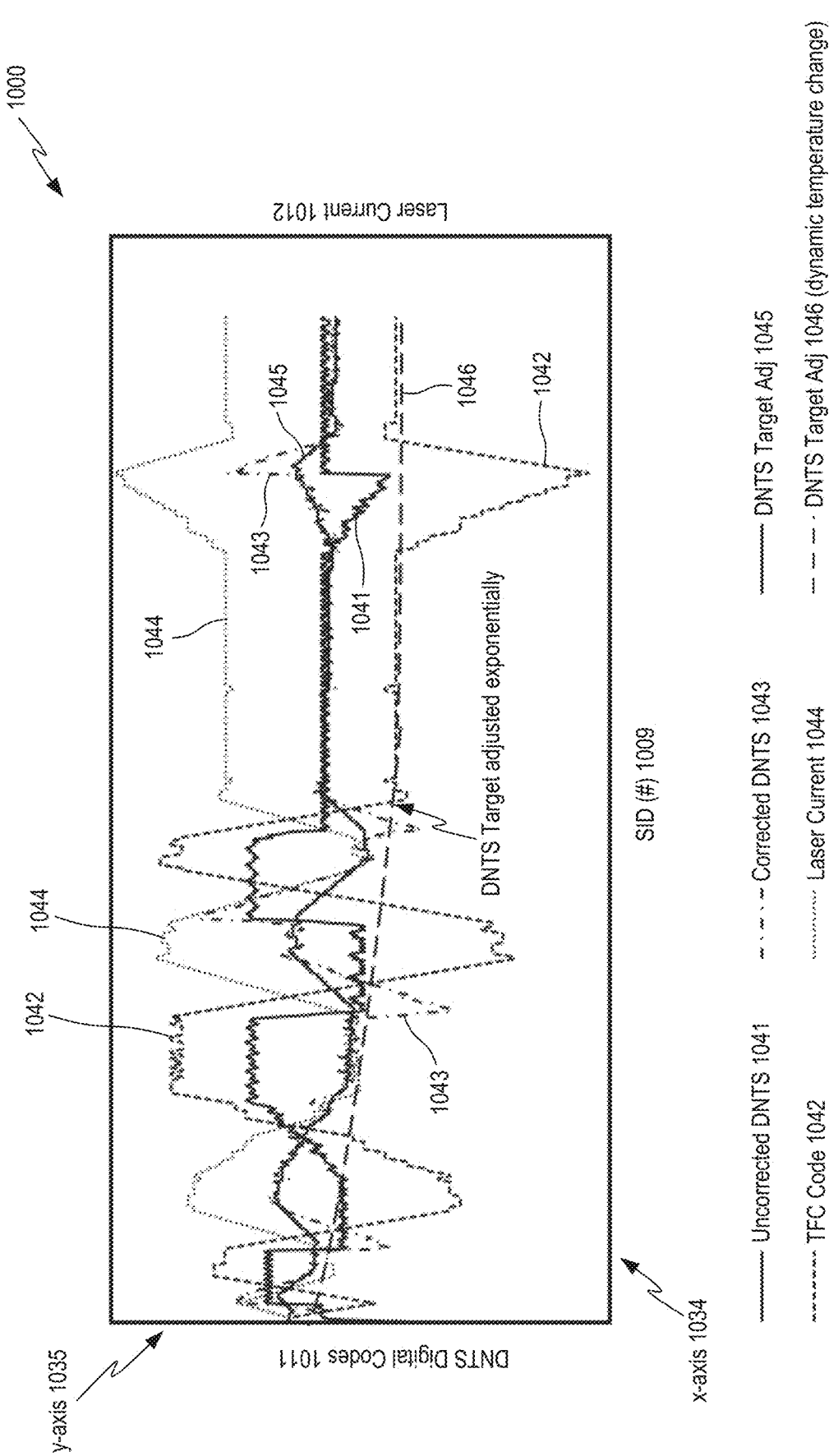
FIG. 10 is a conceptual graph showing various traces related to the $3^{rd}$ level laser power correction scheme described with reference to FIG. 7, according to various aspects of the disclosure.

FIG. 10 is a conceptual graph 1000 showing various traces related to the $3^{rd}$ level laser power correction scheme described with reference to FIG. 7, according to various aspects of the disclosure. Specifically, but without limitation, graph 1000 depicts how the DNTS digital codes 1011 and laser current 1012 vary in relation to SID number 1009 (e.g., over a full revolution of the disk of the HAMR drive). Here, DNTS digital codes 1011 and laser current 1012 are depicted along the vertical or y-axis 1035, and SID numbers 1009 are shown along the horizontal or x-axis 1034. Furthermore, graph 1000 depicts a first trace 1041 (uncorrected DNTS), a second trace 1042 (TFC code), a third trace 1043 (corrected or adjusted DNTS), a fourth trace 1044 (laser current), a fifth trace 1045 (DNTS target adjusted), and a sixth trace 1046. The graph 1000 in FIG. 10 also depicts an example (sixth trace 1046) showing how the DNTS target is adjusted exponentially (e.g., to compensate for dynamic temperature changes), in accordance with various aspects of the disclosure.

Figure 11:
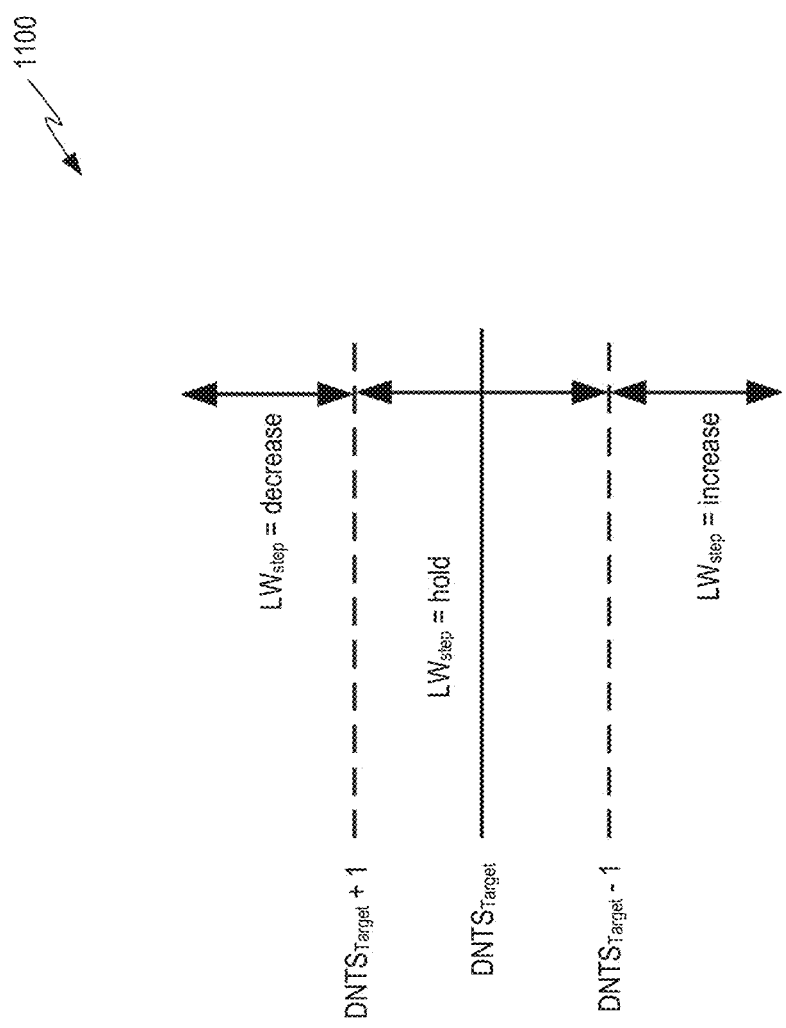
FIG. 11 is an example showing how laser write bias (LW) is adjusted based on comparing an average DNTS value with a target DNTS value, according to various aspects of the disclosure.

FIG. 11 is an example (1100) showing how laser write bias ($LW_{Bias}$) is adjusted based on comparing an average DNTS value with a target DNTS value, according to various aspects of the disclosure. In some aspects, the FIG. 11 depicts how the laser feedback algorithm of the present disclosure can be implemented. As described above, the $LW_{step}$ decision (e.g., increase, decrease, or hold) can be determined from comparing the $DNTS_{AVG}$ to the $DNTS_{Target}$ (e.g., $1^{st}$ level laser power correction scheme described in relation to FIG. 5). Alternatively, the $LW_{step}$ decision can be determined from comparing the $DNTS_{AVG}$ to the adjusted $DNTS_{Target}$ (i.e., $DNTS_{adjust}$), as described with reference to FIGS. 6 and/or 7.

As seen in FIG. 11, if the $DNTS_{AVG}=DNTS_{Target}-1$, $LW_{step}$=increase. Similarly, if the $DNTS_{AVG}=DNTS_{Target}+1$, $LW_{step}$=decrease. Furthermore, a 'hold' decision may be returned for the $LW_{step}$ if the $DNTS_{AVG}$ is equal or substantially equal to the $DNTS_{Target}$. In this example, if the $DNTS_{AVG}$ is between $DNTS_{Target}+1$ and $DNTS_{Target}-1$, LWstep=hold.

Any suitable control circuitry (e.g., control circuitry 22 in FIG. 2A) may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or SoC (e.g., SoC 101 in FIG. 1B). In addition, control circuitry 22 may include a preamp circuit implemented as a separate integrated circuit, integrated into the read channel or data storage controller circuit, or integrated into the SoC.

In some examples, the control circuitry, such as, but not limited to, control circuitry 22, comprises a microprocessor executing instructions, the instructions being operable to cause the microprocessor to perform the flow diagrams (e.g., method 80 shown in FIG. 2C) described herein. The instructions may be stored in any computer-readable medium. In some examples, they may be stored on a non-volatile semiconductor memory device, component, or system external to the microprocessor, or integrated with the microprocessor in the SoC 101. In some examples, the instructions are stored on the disk and read into a volatile semiconductor memory when the disk drive is powered on. In some examples, the control circuitry 22 comprises suitable logic circuitry, such as state machine circuitry. In some examples, at least some of the flow diagram blocks (e.g., method 80) may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute control circuitry 22 as described herein and may perform one or more of the functions of control circuitry 22 as described herein. In various examples, control circuitry 22, or another processing device performing one or more of the functions of control circuitry as described herein, may be abstracted away from being physically proximate to the disks and disk surfaces. The control circuitry, or another processing device performing one or more of the functions of control circuitry as described herein, may be part of or proximate to a rack of or a unitary product comprising multiple data storage devices, may be part of or proximate to one or more physical or virtual servers, may be part of or proximate to one or more local area networks or one or more storage area networks, may be part of or proximate to a data center, or may be hosted in one or more cloud services.

In various examples, a disk drive, such as disk drive 15, may include a magnetic disk drive (e.g., employing heat assisted magnetic recording or HAMR), an optical disk drive, a hybrid disk drive, or other types of disk drives. In addition, some examples may include electronic devices such as computing devices, data server devices, media content storage devices, or other devices, components, or systems that may comprise the storage media and/or control circuitry described above.

The various features and processes described above may be used independently of one another or may be combined in various ways. All possible combinations and subcombinations are intended to fall within the scope of this disclosure. In addition, certain method, event or process blocks may be omitted in some implementations. The methods and processes described herein are not limited to any particular sequence, and the blocks or states relating thereto can be performed in other sequences. For example, tasks or events may be performed in an order other than that specifically disclosed, or multiple tasks or events may be combined in a single block or state. The tasks or events may be performed in serial, in parallel, or in another manner. Tasks or events may be added to or removed from the disclosed examples. The systems and components described herein may be configured differently than described. For example, elements may be added to, removed from, or rearranged compared to the disclosed examples.

While certain embodiments are described herein, these embodiments are presented by way of example only, and do not limit the scope of this disclosure. Nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of this disclosure.

Method 80 and other methods of this disclosure may include other steps or variations in various other embodiments. Some or all of method 80 may be performed by or embodied in hardware, or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for laser mode hop compensation using multi-sector feedback in a data storage device configured for HAMR. Those of skill in the art will be well-equipped by this disclosure with an understanding and an informed reduction to practice of a wide panoply of further applications, architectures, techniques, and methods for laser mode hop compensation using multi-sector feedback in a HAMR drive, and other aspects of this disclosure encompassed by the present disclosure and by the claims set forth below.

As used herein, the recitation of "at least one of A, B and C" is intended to mean "either A, B, C or any combination of A, B and C." The disclosed examples are provided to enable any person skilled in the relevant fields of art to understand how to make or use the subject matter of this disclosure. Various modifications to these embodiments will be readily apparent to those skilled in the art based on this disclosure, and the generic principles defined herein may be applied to other examples without departing from the spirit or scope of this disclosure. Thus, this disclosure is not limited to the embodiments shown herein but is to be accorded the widest scope consistent with the principles and novel features disclosed herein.

This disclosure and many of its attendant advantages will be understood by the foregoing description, and various changes may be made in the form, construction, and arrangement of the components without departing from the disclosed subject matter or without sacrificing its material advantages. The form described is merely explanatory, and the following claims encompass and include a wide range of embodiments, including a wide range of changes in the form, construction, and arrangement of components as described herein.

While this disclosure has been described with reference to various examples, these examples are illustrative, and the scope of the disclosure is not so limited. The subject matter described herein is presented in the form of illustrative, non-limiting examples, and not as exclusive implementations, whether or not they are explicitly called out as examples as described. Many variations, modifications, and additions are possible within the scope of the examples of the disclosure. More generally, examples in accordance with this disclosure have been described in the context of particular implementations. Functionality may be separated or combined in blocks differently or described with different terminology, without departing from the spirit and scope of this disclosure and the following claims. These and other variations, modifications, additions, and improvements may fall within the scope of this disclosure as defined in the following claims.

The invention claimed is:

1. A data storage device comprising:
   a disk;
   a read/write head configured to read data from and write data to the disk;
   a laser diode coupled to a nearfield transducer configured to heat an area of the disk near the read/write head;
   a first resistive temperature detector (RTD);
   a second RTD; and
   one or more processing devices configured to:
   apply a laser bias to the laser diode during a write operation;
   obtain a plurality of differential signal measurements, based at least in part on a plurality of measurements from each of the first RTD and the second RTD; and
   adjust the laser bias applied to the laser diode, based at least in part on comparing the plurality of differential signal measurements to a target value for the differential signal.

2. The data storage device of claim 1, wherein the first RTD comprises a nearfield transducer temperature sensor (NTS), and wherein the second RTD comprises an embedded contact sensor (ECS).

3. The data storage device of claim 2, wherein obtaining the plurality of differential signal measurements comprises:
   obtaining a plurality of NTS measurements from the NTS for a plurality of sectors;
   obtaining a plurality of ECS measurements from the ECS for the plurality of sectors; and
   subtracting a respective ECS measurement from a respective NTS measurement to obtain at least one differential signal measurement for each of the plurality of sectors; and
   wherein each of the plurality of differential signal measurements comprises a DNTS measurement, and wherein the target value for the differential signal comprises a DNTS target value.

4. The data storage device of claim 3, wherein the one or more processing devices are further configured to:
   compute an average of at least two of the plurality of DNTS measurements, wherein each of the at least two DNTS measurements correspond to different sectors; and
   wherein comparing the plurality of differential signal measurements to the target value for the differential signal comprises:
   determining a DNTS error, based at least in part on comparing the average of the at least two DNTS measurements to the DNTS target value.

5. The data storage device of claim 4, wherein the DNTS target value is specific to the read/write head and is based at least in part on one or more of a write current, a laser current, a temperature, and fly-height control information for the read/write head.

6. The data storage device of claim 1, wherein the one or more processing devices are further configured to:
   determine a first sensitivity, wherein the first sensitivity comprises a differential signal measurement of the plurality of differential signal measurements (DNTS) to laser bias sensitivity; and
   wherein adjusting the laser bias applied to the laser diode further comprises:
   determining a laser bias correction, wherein the laser bias correction is based on the first sensitivity and a DNTS error, wherein the DNTS error is based on comparing an average of at least two DNTS measurements to a DNTS target value; and
   adding the laser bias correction to the laser bias.

7. The data storage device of claim 6, wherein the one or more processing devices are further configured to perform at least one of:
   determining a second sensitivity, wherein the second sensitivity comprises a DNTS to thermal fly height control (TFC) sensitivity; and
   determining a third sensitivity, wherein the third sensitivity comprises a TFC to laser bias correction sensitivity.

8. The data storage device of claim 7, wherein the one or more processing devices are further configured to:
   determine a TFC value for controlling a fly-height of the read/write head, wherein the TFC value is based at least in part on the DNTS target value; and
   wherein the second sensitivity and the third sensitivity are determined via TFC dithering.

9. The data storage device of claim 8, wherein the one or more processing devices are further configured to:
   monitor a change in the fly-height of the read/write head;
   determine a TFC correction to compensate for the change in the fly-height of the read/write head, wherein the TFC correction is based at least in part on one or more of the laser bias correction, the second sensitivity, and the third sensitivity; and
   adjust the TFC value, based at least in part on determining the TFC correction.

10. The data storage device of claim 8, wherein the one or more processing devices are further configured to:

adjust the TFC value to compensate for a change in fly-height of the read/write head, wherein adjusting the TFC value is based at least in part on one or more of the DNTS target value, the DNTS error, the laser bias correction, the first sensitivity, the second sensitivity, the third sensitivity, a TFC correction, and an adjusted DNTS target value.

11. The data storage device of claim 10, wherein adjusting the laser bias applied to the laser diode is further based at least in part on adjusting the TFC value and adjusting the DNTS target value.

12. The data storage device of claim 8, wherein the one or more processing devices are further configured to:
 adjust the DNTS target value, based at least in part on a TFC correction value and at least one of the second sensitivity and the third sensitivity; and
 wherein adjusting the laser bias is further based at least in part on adjusting the DNTS target value.

13. The data storage device of claim 12, wherein the one or more processing devices are further configured to:
 measure a laser diode voltage ($V_{LD}$) at a pre-write time or prior to the write operation; and
 wherein adjusting the DNTS target value is further based on one or more of a temperature change profile for the laser diode and the $V_{LD}$.

14. A method of operating a data storage device, comprising:
 applying a laser bias to a laser diode of the data storage device during a write operation, wherein the data storage device comprises:
  a disk,
  a read/write head configured to read data from and write data to the disk,
  the laser diode coupled to a nearfield transducer configured to heat an area of the disk near the read/write head,
  a first resistive temperature detector (RTD), and
  a second RTD;
 obtaining a plurality of differential signal measurements, based at least in part on a plurality of measurements from each of the first RTD and the second RTD; and
 adjusting the laser bias applied to the laser diode, based at least in part on comparing the plurality of differential signal measurements to a target value for the differential signal.

15. The method of claim 14, wherein the first RTD comprises a nearfield transducer temperature sensor (NTS), and wherein the second RTD comprises an embedded contact sensor (ECS), and wherein obtaining the plurality of differential signal measurements comprises:
 obtaining a plurality of NTS measurements from the NTS for a plurality of sectors;
 obtaining a plurality of ECS measurements from the ECS for the plurality of sectors; and
 subtracting a respective ECS measurement from a respective NTS measurement to obtain at least one differential signal measurement for each of the plurality of sectors; and
 wherein each of the plurality of differential signal measurements comprises a DNTS measurement, and wherein the target value for the differential signal comprises a DNTS target value.

16. The method of claim 15, further comprising:
 computing an average of at least two of the plurality of DNTS measurements, wherein each of the at least two DNTS measurements correspond to different sectors; and
 wherein comparing the plurality of differential signal measurements to the target value for the differential signal comprises:
  determining a DNTS error, based at least in part on comparing the average of the at least two DNTS measurements to the DNTS target value.

17. The method of claim 14, further comprising:
 determining a first sensitivity, wherein the first sensitivity comprises a differential signal measurement of the plurality of differential signal measurements (DNTS) to laser bias sensitivity; and
 wherein adjusting the laser bias applied to the laser diode further comprises:
  determining a laser bias correction, wherein the laser bias correction is based on the first sensitivity and a DNTS error, wherein the DNTS error is based on comparing an average of at least two DNTS measurements to a DNTS target value; and
  adding the laser bias correction to the laser bias.

18. The method of claim 17, further comprising:
 determining a second sensitivity, wherein the second sensitivity comprises a DNTS to thermal fly height control (TFC) sensitivity; and
 determining a third sensitivity, wherein the third sensitivity comprises a TFC to laser bias correction sensitivity.

19. The method of claim 18, further comprising:
 determining a TFC value for controlling a fly-height of the read/write head, wherein the TFC value is based at least in part on the DNTS target value; and
 wherein the second sensitivity and the third sensitivity are determined via TFC dithering.

20. The method of claim 19, further comprising:
 monitoring a change in the fly-height of the read/write head;
 determining a TFC correction to compensate for the change in the fly-height of the read/write head, wherein the TFC correction is based at least in part on one or more of the laser bias correction, the second sensitivity, and the third sensitivity; and
 adjusting the TFC value, based at least in part on the TFC correction.

21. The method of claim 19, further comprising:
 adjusting the TFC value to compensate for a change in fly-height of the read/write head, wherein adjusting the TFC value is based at least in part on one or more of the DNTS target value, the DNTS error, the laser bias correction, the first sensitivity, the second sensitivity, the third sensitivity, a TFC correction, and an adjusted DNTS target value.

22. The method of claim 21, wherein adjusting the laser bias applied to the laser diode is further based at least in part on adjusting the TFC value and adjusting the DNTS target value.

23. The method of claim 19, further comprising:
 adjusting the DNTS target value, based at least in part on a TFC correction value and at least one of the second sensitivity and the third sensitivity; and
 wherein adjusting the laser bias is further based at least in part on adjusting the DNTS target value.

24. The method of claim 23, further comprising:
 measuring a laser diode voltage ($V_{LD}$) at a pre-write time or prior to the write operation; and
 wherein adjusting the DNTS target value is further based on one or more of a temperature change profile for the laser diode and the $V_{LD}$.

25. One or more processing devices, comprising:
  means for applying, during a write operation, a laser bias to a laser diode of a data storage device, wherein the data storage device comprises:
    a disk,
    a read/write head configured to read data from and write data to the disk,
    the laser diode coupled to a nearfield transducer configured to heat an area of the disk near the read/write head,
    a first resistive temperature detector (RTD), and
    a second RTD;
  means for obtaining a plurality of differential signal measurements, based at least in part on obtaining a plurality of measurements from each of the first RTD and the second RTD;
  means for determining a target value for a differential signal, wherein the differential signal is associated with the first RTD and the second RTD; and
  means for adjusting the laser bias applied to the laser diode, based at least in part on:
    comparing the plurality of differential signal measurements to the target value for the differential signal; and
    one or more of a plurality of sensitivity adjustments, comprising (1) a differential signal measurement to thermal fly height control (TFC) sensitivity, and (2) a thermal fly height control (TFC) to laser bias correction sensitivity.

* * * * *